US012801871B2

(12) United States Patent
Araki et al.

(10) Patent No.: US 12,801,871 B2
(45) Date of Patent: Nov. 17, 2026

(54) DISPLAY CONTROL SYSTEM, METHOD, AND INFORMATION PROCESSING APPARATUS

(71) Applicant: CANON KABUSHIKI KAISHA, Tokyo (JP)

(72) Inventors: Go Araki, Shizuoka (JP); Tomoyuki Shigeta, Kanagawa (JP); Keigo Kurihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/898,432

(22) Filed: Sep. 26, 2024

(65) Prior Publication Data

US 2025/0111175 A1 Apr. 3, 2025

(30) Foreign Application Priority Data

Oct. 2, 2023 (JP) ................................ 2023-171097

(51) Int. Cl.
*G06K 7/08* (2006.01)
*G06K 7/10* (2006.01)

(52) U.S. Cl.
CPC ................................ *G06K 7/10128* (2013.01)

(58) Field of Classification Search
CPC .. G06Q 10/087; G06Q 10/08; G06Q 10/0833; G06Q 20/3278; G06Q 20/32; G06K 7/10366; G06K 19/0723; G06K 7/10732; G06K 7/10; G06K 7/10861; G06K 7/10128
USPC ........................................ 235/451, 492, 385
See application file for complete search history.

(56) References Cited

U.S. PATENT DOCUMENTS 8,690,057 B2 * 4/2014 Schoening ............ G06F 16/245 340/572.1
11,671,190 B2 * 6/2023 Nishimura ............... H04B 1/06 375/224
12,271,779 B2 * 4/2025 Nakajima .......... G06K 7/10366
2010/0201520 A1 * 8/2010 Stern ..................... G01S 13/878 340/572.1
2018/0293535 A1 * 10/2018 Christopher ......... G06Q 10/087
2019/0220715 A1 * 7/2019 Park ...................... G06Q 10/087
2022/0417895 A1 * 12/2022 Shimura ............... G01S 5/0295
2024/0161058 A1 5/2024 Kitamura

FOREIGN PATENT DOCUMENTS

EP 2091008 * 8/2009 ........... G06Q 10/087
JP 2006117413 A 5/2006
JP 2007323497 A 12/2007

(Continued)

*Primary Examiner* — Daniel St Cyr
(74) *Attorney, Agent, or Firm* — Canon U.S.A., Inc. IP Division

(57) ABSTRACT

A display control system segments a real space into a plurality of coordinate areas regularly. The display control system includes one or more processors and one or more memories storing instructions. When executed by the one or more processors, the instructions cause the display control system to set a block area from at least one of the coordinate areas and display, on a display device, block area information that represents the block area and coordinate area information regarding the coordinate area to which position coordinates estimated for each of a plurality of targets of management belong.

10 Claims, 24 Drawing Sheets

(56) References Cited

FOREIGN PATENT DOCUMENTS

| | | | | |
|---|---|---|---|---|
| JP | 2010066149 | * | 2/2010 | ............. G06K 17/00 |
| JP | 2020129312 A | | 8/2020 | |
| JP | 2021141415 A | | 9/2021 | |
| JP | 2023023177 A | | 2/2023 | |

* cited by examiner

FIG. 5

310

| TAG ID (311) | TARGET ID (312) | NAME (313) | TARGET TYPE (314) | LOCATED ZONE (315) | COORDINATE (316) |
|---|---|---|---|---|---|
| TG011 | IT11 | MATERIAL A1 | T1 | AA21 | (u, v, h) |
| TG012 | IT12 | MATERIAL A2 | T1 | AA21 | (u, v, h) |
| TG021 | IT21 | MATERIAL B1 | T2 | A000 | (u, v, h) |
| TG022 | IT22 | MATERIAL B2 | T2 | A000 | (u, v, h) |
| TG031 | IT31 | FIXTURE C1 | T3 | A000 | (u, v, h) |
| : | : | : | : | : | : |
| TG091 | UR91 | WORKER Z1 | T9 | AA10 | (u, v, h) |
| : | : | : | : | : | : |

FIG. 6

320

| ZONE ID (321) | NAME (322) | PARENT ZONE (323) | LEVEL (324) | MAP IMAGE (325) | SCALE (326) | AZIMUTH (327) |
|---|---|---|---|---|---|---|
| A000 | AREA A | – | 1 | IMA0 | xxx | yyy |
| AA00 | BUILDING A | A000 | 2 | – | – | – |
| AA10 | FLOOR A1 | AA00 | 3 | IMA1 | xxx | yyy |
| AA20 | FLOOR A2 | AA00 | 3 | IMA2 | xxx | yyy |
| AA21 | ROOM A2-1 | AA20 | 4 | – | – | – |
| AA22 | ROOM A2-2 | AA20 | 4 | – | – | – |
| : | : | : | : | : | : | : |
| B000 | AREA B | – | 1 | IMB0 | xxx | yyy |
| : | : | : | : | : | : | : |

FIG. 7A

330

331 332 333

| TAG ID | INSTALLED LOCATION | TAG LOCATION |
|---|---|---|
| TG500 | A000 | (U, V, H) |
| TG511 | AA10 | (U, V, H) |
| TG512 | AA10 | (U, V, H) |
| TG513 | AA10 | (U, V, H) |
| TG514 | AA20 | (U, V, H) |
| TG515 | AA21 | (U, V, H) |
| TG516 | AA22 | (U, V, H) |
| : | : | : |
| TG600 | B000 | (U, V, H) |
| : | : | : |

FIG. 7B

340

341 342 343

| READER ID | NAME | USER |
|---|---|---|
| RD01 | READER A | UR91 |
| RD02 | READER B | UR92 |
| : | : | : |

FIG. 9

350

| WORK ID (351) | SITE (352) | PROCESS ID (353) | DUE DATE (354) | TARGET (355) | PLANNED PLACE (356) | PROCESS STATUS (357) | DATE OF COMPLETION (358) | AUXILIARY STATUS (359) |
|---|---|---|---|---|---|---|---|---|
| P1 | A000 | P11 | D11 | IT11 | AA00 | COMPLETED | D11 | YES |
| | | | | IT12 | AA00 | COMPLETED | D11 | YES |
| | | | | IT21 | AA00 | COMPLETED | D11 | – |
| | | | | : | : | : | : | : |
| | | : | : | : | : | : | : | : |
| | | P15 | D15 | IT11 | AA21 | NOT COMPLETED YET | – | – |
| | | | | IT12 | AA22 | NOT COMPLETED YET | – | – |
| | | | | : | : | : | : | : |
| | | : | : | : | : | : | : | : |
| | | P19 | D19 | IT11 | (u5, v5, h5) | NOT COMPLETED YET | – | – |
| | | | | : | : | : | : | : |
| P2 | A000 | : | : | : | : | : | : | : |

FIG. 12A

360

| MEASUREMENT TIME (361) | READER ID (362) | MOVEMENT AMOUNT (363) |
|---|---|---|
| ymd1 | RD01 | (x1, y1, z1) |
| ymd2 | RD01 | (x2, y2, z2) |
| ymd3 | RD01 | (x3, y3, z3) |
| ymd4 | RD01 | (x4, y4, z4) |
| ymd5 | RD01 | (x5, y5, z5) |
| ymd6 | RD01 | (x6, y6, z6) |
| : | : | : |

FIG. 12B

370

| READING TIME (371) | TAG ID (372) | READER ID (373) | RECEPTION INTENSITY (374) |
|---|---|---|---|
| ymd1 | TG511 | RD01 | L01 |
| ymd5 | TG011 | RD01 | L05 |
| ymd6 | TG021 | RD01 | L06 |
| : | : | : | : |

FIG. 13A

380a

| TARGET TYPE (381) | TYPE NAME (383) | COLLATION LEVEL (385) |
|---|---|---|
| T1 | MATERIAL A | 2 |
| T2 | MATERIAL B | 2 |
| T3 | FIXTURE | 3 |
| : | : | : |

FIG. 13B

380b

| PROCESS TYPE (382) | TYPE NAME (384) | COLLATION LEVEL (385) |
|---|---|---|
| Px1 | CARRYING INTO SITE | 2 |
| Px2 | DISTRIBUTION TO FLOORS | 3 |
| : | : | : |
| Px9 | FIXING | 4 |

FIG. 13C

380c

| TARGET TYPE (381) | PROCESS TYPE (382) | COLLATION LEVEL (385) |
|---|---|---|
| T1 | Px1 | 2 |
| T1 | Px2 | 2 |
| T1 | : | : |
| T2 | Px1 | 3 |
| T2 | Px2 | 4 |
| T2 | : | : |
| : | : | : |

DISPLAY CONTROL SYSTEM, METHOD, AND INFORMATION PROCESSING APPARATUS

BACKGROUND

Field of the Disclosure

Some aspects of embodiments relate to a display control system, a method, and an information processing apparatus.

Description of the Related Art

Radio frequency identification (RFID) is a technique for making it possible to read information embedded in a small-sized device, also called "tag," by means of an external reader using near field wireless communication. For example, attaching an RFID tag in which unique identification information is embedded to an article makes it possible to know the whereabouts of the article efficiently and makes it easier to visualize information on the article that is under management. Among others, a passive-type RFID tag, which transmits information by using the energy of an electromagnetic wave emitted from a reader, is low in manufacturing cost because a battery is unnecessary, and thus can operate semi-permanently; therefore, the use of this type of RFID tags is spreading in various scenes.

Japanese Patent Laid-Open No. 2020-129312 discloses a management system that uses RFID for increasing efficiency in managing the progress of construction work. In the management system disclosed in Japanese Patent Laid-Open No. 2020-129312, in a situation where RFID tags are installed at particular places and RFIDs are attached to construction materials, the user is provided with latest information regarding the located places and statuses of construction materials on the basis of information read by a hand-held terminal from these RFID tags.

Japanese Patent Laid-Open No. 2021-141415 discloses a technique that combines reading of information from an RFID tag with a self-location estimation method for the purpose of estimating the location of the target of management without relying on global positioning system (GPS) measurement, which tends to be unstable in an environment in which there exist many shielding entities. In the technique disclosed in Japanese Patent Laid-Open No. 2021-141415, the located place of the target of management is estimated on the basis of the known location of a location tag and a relative movement amount of a reading device calculated in accordance with a self-location estimation method (also called "pedestrian dead reckoning" (PDR)).

Each of Japanese Patent Laid-Open Nos. 2020-129312 and 2021-141415 suggests that information that includes the calculated located place of the article is visualized. However, on an actual work site such as a construction work site, many articles could exist. Therefore, if the located places of these articles are simply visualized, congestion of pieces of information occurs on the screen, resulting in poor visibility of the information. In addition, if the method disclosed in Japanese Patent Laid-Open No. 2020-129312, which relies solely on the reading of information from RFID tags, is employed, there is no option but to install the RFID tags with high density in order to estimate the located place of an article. Though it is possible to overcome this disadvantage by combining tag reading with a self-location estimation method as in the method disclosed in 2021-141415, the self-location estimation method is susceptible to the influence of cumulative errors. Therefore, an innovative way of display that effectively assists the user in grasping the located place is demanded when displaying information regarding the estimated located place.

SUMMARY

Some embodiments provide an improved scheme for displaying information regarding the located place of the target of management.

According to a certain aspect of the embodiments, a display control system that has the following configuration is provided. The display control system includes a plurality of first wireless devices, at least one reading device, and one or more processors and one or more memories. The plurality of first wireless devices is attached respectively to a plurality of targets of management movable in a real space. First identification information for identifying a corresponding target of management is stored in each of the plurality of first wireless devices. The at least one reading device is capable of reading, from a wireless device, identification information stored in the wireless device. The one or more memories store instructions that, when executed by the one or more processors, cause the display control system to estimate, based on a result of reading the first identification information from the first wireless device by a first reading device, position coordinates where each of the plurality of targets of management is located, cause a display device to display information regarding the plurality of targets of management, segment the real space into a plurality of coordinate areas regularly and set a block area from at least one of the coordinate areas, and display, on the display device, block area information that represents the block area and coordinate area information regarding the coordinate area to which the position coordinates estimated for each of the plurality of targets of management belong.

Further features of various embodiments will become apparent from the following description of exemplary embodiments with reference to the attached drawings.

BRIEF DESCRIPTION OF THE DRAWINGS

FIG. 5 is a diagram for explaining an example of the configuration of a target table according to an embodiment.

FIG. 6 is a diagram for explaining an example of the configuration of a zone table according to an embodiment.

FIG. 7A is a diagram for explaining an example of the configuration of a location tag table according to an embodiment.

FIG. 7B is a diagram for explaining an example of the configuration of a reader table according to an embodiment.

FIG. 9 is a diagram for explaining an example of the configuration of a work process table according to an embodiment.

FIG. 12A is a diagram for explaining an example of the configuration of a movement amount table according to an embodiment.

FIG. 12B is a diagram for explaining an example of the configuration of a tag detection table according to an embodiment.

FIG. 13A is a diagram for explaining an example of a granularity control table according to an embodiment.

FIG. 13B is a diagram for explaining another example of a granularity control table according to an embodiment.

FIG. 13C is a diagram for explaining another example of a granularity control table according to an embodiment.

DESCRIPTION OF THE EMBODIMENTS

Figure 1:
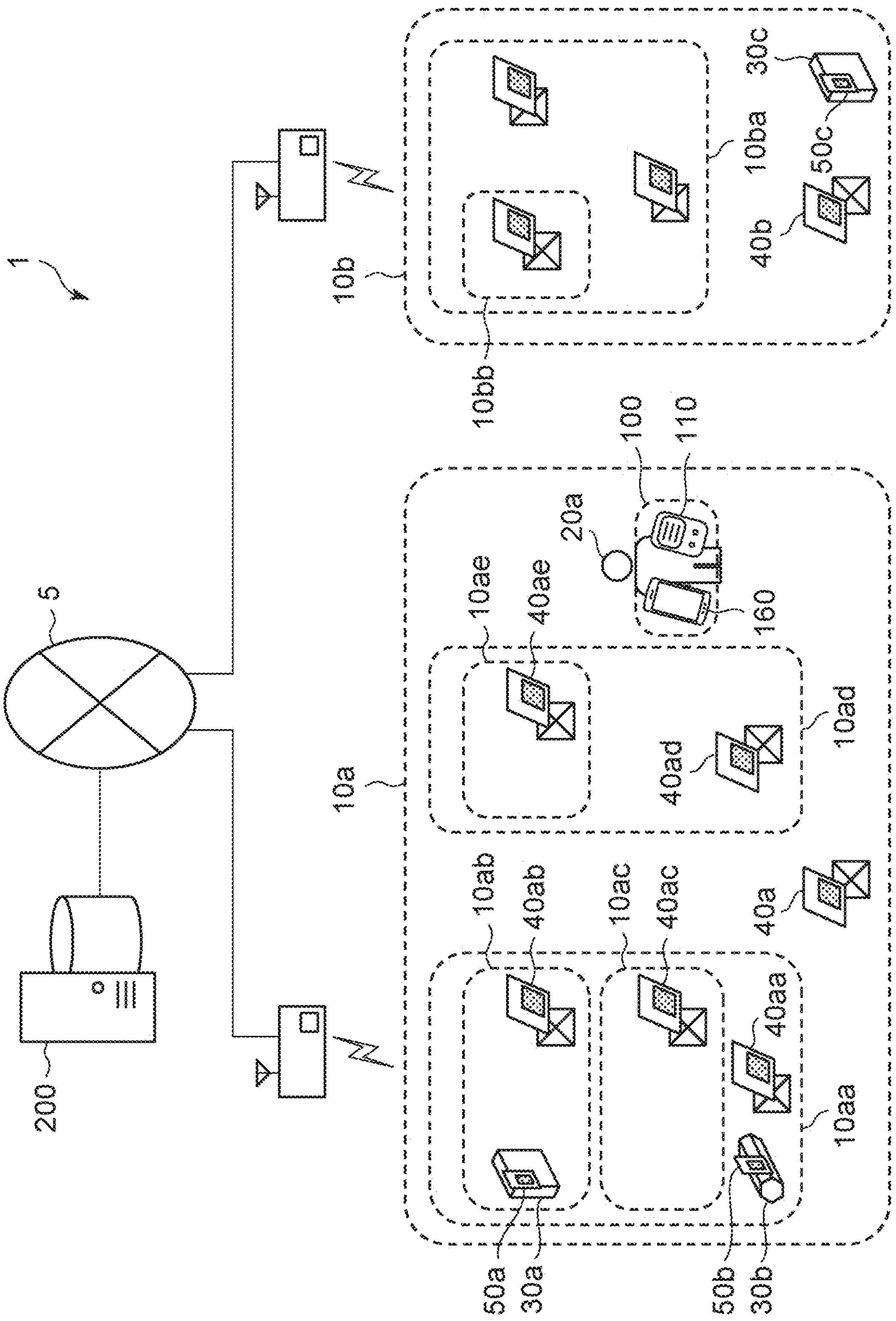
FIG. 1 is a schematic view illustrating an example of the configuration of a process management system according to an embodiment.

With reference to the accompanying drawings, embodiments will now be described in detail. The description of the embodiments below shall not be construed to limit the scope of the appended claims. Though a plurality of features will be described in the embodiments, not all of these features are necessarily indispensable for embodying the present disclosure. Any two or more of these features may be combined where appropriate. In the accompanying drawings, the same reference numerals are assigned to the same or similar components, and the same explanation thereof will not be repeated.

1. Overview of System

FIG. 1 is a schematic view illustrating an example of the configuration of a process management system 1 according to an embodiment. The process management system 1 is a system configured to provide assistance in keeping track of the located place of the target of management that could change from day to day as the work progresses and in visualizing information regarding the progress of the work. A work discussed in this specification is made up of one or more work processes, and at least one work process involves movement of the target of management. In the description below, a real space where a work is performed is referred to also as “work space”. For example, a work of constructing a building could include a series of work processes such as carrying construction materials into a construction site, distributing the construction materials to floors or rooms, and fixing the construction materials. The target of management may include either one of an article that exists in a real space and a user who acts in a real space, or both. The article may be a non-living thing (for example, a machine, equipment, an appliance, a material, a consumable, parts, a vehicle, or a robot) or a living thing (for example, an animal or a plant). In the description below, a work of constructing a building will be mainly discussed as an example; however, the technique disclosed herein can be applied also to other kinds of work, for example, performing road construction, setting up an event venue, grasping the number of persons at an event venue, and the like. Another name, a display control system 1, may be given to the process management system 1 because the process management system 1 controls the display of information regarding the target of management. The uses of display control to be described later are not limited to process management.

In the present embodiment, the process management system 1 manages location information that indicates the located place of each target of management. A plurality of zones is set in a real space for the purpose of management of location information. These zones are candidates for the located place of each target of management. The location information of each target of management further includes two-dimensional or three-dimensional position coordinates of the spot where this target of management is estimated to be located.

FIG. 1 is a schematic view illustrating an example of the configuration of the process management system 1 according to the present embodiment. In the example illustrated in FIG. 1, a plurality of zones 10*a*, 10*aa*, 10*ab*, 10*ac*, 10*ad*, 10*ae*, 10*b*, 10*ba*, and 10*bb* is set in a real space. The zone 10*a* and the zone 10*b* could correspond to, for example, areas that are geographically away from each other (for example, different construction sites). The zone 10*aa* and the zone 10*ad* are zones that are set inside the zone 10*a* in such a way as to have spatial granularity that is finer than spatial granularity of the zone 10*a*, and could correspond to, for example, different buildings that are constructed in a certain area. The zone 10*ab* and the zone 10*ac* are zones that are set inside the zone 10*aa* in such a way as to have spatial granularity that is finer than spatial granularity of the zone 10*aa*, and could correspond to, for example, different floors that constitute a certain building. Similarly, the zone 10*ae* is a zone that is set inside the zone 10*ad* in such a way as to have spatial granularity that is finer than spatial granularity of the zone 10*ad*. Sub zones that could correspond to rooms may be set inside each floor, with still finer spatial granularity, though not illustrated in FIG. 1. As described above, a plurality of zones set inside a work space has a tree-like hierarchical relationship. Zone data to be described later defines the hierarchical relationship. In the description below, in a hierarchical relationship among a plurality of zones, a zone that is set with a relatively coarse spatial granularity will be referred to also as “upper level zone”, and a zone that is set with a relatively fine spatial granularity will be referred to also as "lower level zone". For example, the zones 10*aa*, 10*ab*, 10*ac*, 10*ad*, and 10*ae* are lower level zones in relation to the zone 10*a*.

In the example illustrated in FIG. 1, a user 20*a* moves from one to another of a plurality of zones while carrying a reading system 100. In this specification, the meaning of "a user carries some kind of a target stuff" encompasses a wide variety of modes in which the user moves together with the target stuff (for example, the user moves while carrying the target stuff by hand, or with the target stuff worn, to name but a few). Articles 30*a*, 30*b*, and 30*c* exist in the zones 10*ab*, 10*aa*, and 10*b* respectively. These articles are targets whose location information is managed by the process management system 1. In addition to the articles, users (for example, workers, a supervisor(s), and other persons concerned) may also be included in the targets of management.

For the purpose of keeping track of the located place of the target of management, the process management system 1 uses a wireless device called "tag". A location tag is a wireless device (second wireless device) installed in each of zones that are candidates for the located place of the target of management in the process management system 1. In the illustrated system, a location tag 40*a* is installed in the zone 10*a*, a location tag 40*aa* is installed in the zone 10*aa*, a location tag 40*ab* is installed in the zone 10*ab*, a location tag 40*ac* is installed in the zone 10*ac*, a location tag 40*ad* is installed in the zone 10*ad*, and a location tag 40*ae* is installed in the zone 10*ae*. Similarly, a location tag 40*b* is installed in the zone 10*b*. Two or more location tags may be installed in one zone. In the example illustrated in FIG. 1, three location tags are installed in the zone 10*ba*. In the internal memory of each of the location tags, identification information (second identification information) that is associated with the corresponding zone in which this tag is installed is stored.

A target tag is a wireless device (first wireless device) attached to each target of management in the process management system 1. In FIG. 1, a target tag 50*a* attached to the article 30*a*, a target tag 50*b* attached to the article 30*b*, and a target tag 50*c* attached to the article 30*c* are illustrated.

In the internal memory of each of the target tags, identification information (first identification information) for identifying the target of management to which this tag is attached is stored.

In the description below, when there is no need for making distinctions between the zones 10*a* to 10*bb*, they will be collectively referred to as the zone(s) 10 by omitting the alphabet(s) suffixed to the reference numeral.

The same holds true for the articles 30 (article 30*a*, 30*b*, . . . ), the location tags 40 (location tag 40*a*, 40*b*, . . . ), the target tags 50 (target tag 50*a*, 50*b*, . . . ), users 20, and other elements.

The number of zones set in a real space and the number of the targets of management are not limited to those of the example illustrated in FIG. 1 but may be any numbers. Similarly, the number of users who use the process management system 1 and the number of the reading systems 100 (to be described later) carried by the users may also be any numbers. In a hierarchical relationship among a plurality of zones, the number of hierarchical layers may be any number that is at least two. Some practical examples of a set of hierarchical layers are disclosed below for each case where the number of the hierarchical layers is two, three, four, or five. Note that those listed in each pair of parentheses below constitute one set of hierarchical layers and that each hierarchical layer shown relatively on the right side in each list below is a lower hierarchical layer.

Number of Hierarchical Layers=2: (area, building), (building, floor), (building, room), (floor, room);

Number of Hierarchical Layers=3: (area, building, floor), (area, building, room), (building, floor, room);

Number of Hierarchical Layers=4: (area, building, floor, room), (organization, building, floor, room);

Number of Hierarchical Layers=5: (organization, area, building, floor, room).

In the present embodiment, each tag such as the location tag 40 and the target tag 50 is assumed to be a passive-type RFID tag (passive tag). The passive tag includes a compact integrated circuit (IC) chip with a built-in memory, and an antenna. Unique identification information for identifying this tag, and other information, are stored in the memory. In this specification, identification information is simply referred to also as "ID", and identification information for tag identification is referred to also as "tag ID". A tag ID may be regarded as information for identifying the target to which this tag is attached. The IC chip of a passive tag operates by using the energy of an electromagnetic wave emitted from a tag reader, modulates the tag ID and other information that are stored in the memory into an information signal, and transmits (returns) the information signal via the antenna.

In another embodiment, each tag may be an active-type RFID tag. In a case where power supplied from a built-in battery of each tag is used for transmitting information therearound actively (for example, periodically), the tag may be referred to as "beacon tag". In another embodiment, each tag may be a wireless device configured to return information in response to a signal sent from a reader, for example, in conformity with a near field communication (NFC) scheme or a Bluetooth® scheme. Each tag may be referred to by any name such as "IC tag", "IC card", or "responder".

The process management system 1 includes the reading system(s) 100 and a management server 200. The reading system 100 and the management server 200 are connected to a network 5. The network 5 may be a wired network, a wireless network, or any combination of them. Examples of the network 5 include the Internet, an intranet, and a cloud network.

The reading system 100 includes at least a tag reader 110. The tag reader 110 is a reading device capable of reading information stored in a wireless device such as an RFID tag. For example, by reading a tag ID from the target tag 50, the tag reader 110 is capable of detecting the target of management to which the target tag 50 is attached. The tag reader 110 makes a reading try either periodically or in response to some kind of a trigger such as a user operation, and then transmits a tag reading result to the management server 200. The tag reader 110 may be configured to be able to communicate with the management server 200 directly. Also, the tag reader 110 may be configured to be able to communicate with the management server 200 indirectly via some kind of a relaying device (for example, a user terminal 160 to be described below). A further explanation of an example of a specific configuration of the tag reader 110 will be given later.

In the example illustrated in FIG. 1, the reading system 100 further includes the user terminal 160. The user terminal 160 may be any kind of a terminal apparatus or an information processing apparatus such as, for example, a notebook personal computer (PC), a tablet PC, a smartphone, or a smartwatch. The user terminal 160 can be used for interaction with the user 20 by the process management system 1. A further explanation of an example of a specific configuration of the user terminal 160 will be given later.

The management server 200 is an information processing apparatus configured to manage, in a database, location information of the targets of management, statuses regarding the progress of the work, and other information. The management server 200 may be implemented as, for example, an application server, a database server, or a cloud server by using a high-power general-purpose computer. The management server 200 receives the tag reading result from the tag reader 110, and updates the database on the basis of the received tag reading result. The management server 200, when updating the status of each target of management, checks the located place of each target of management estimated on the basis of the tag reading result against the planned place of this target of management in each work process. A further explanation of an example of a specific configuration of the management server 200 will be given later.

Though a single management server 200 is illustrated in FIG. 1, the function of the management server 200 that will be described in detail later may be provided by a single apparatus or through mutually cooperative operations of plural apparatuses that are physically discrete from one another. Though the database is possessed by the management server 200 in the examples described in the present embodiment, a part or a whole of the database may be possessed by another apparatus that is not the management server 200. For example, a part of data may be stored in a wireless device (for example, a location tag or a target tag), the tag reader 110, or the user terminal 160.

In the example illustrated in FIG. 1, the reading system 100 includes the tag reader 110 and the user terminal 160, which are discrete devices. However, the configuration of the reading system 100 is not limited to this example. For example, the tag reader 110 may have a part or a whole of the function of the user terminal 160 that will be described later, or the user terminal 160 may have a part or a whole of the function of the tag reader 110 that will be described later. The function of the management server 200 described in the present embodiment may be embodied by the user terminal 160.

2. Configuration Example of Mobile System

2-1. Configuration Example of Tag Reader

Figure 2:
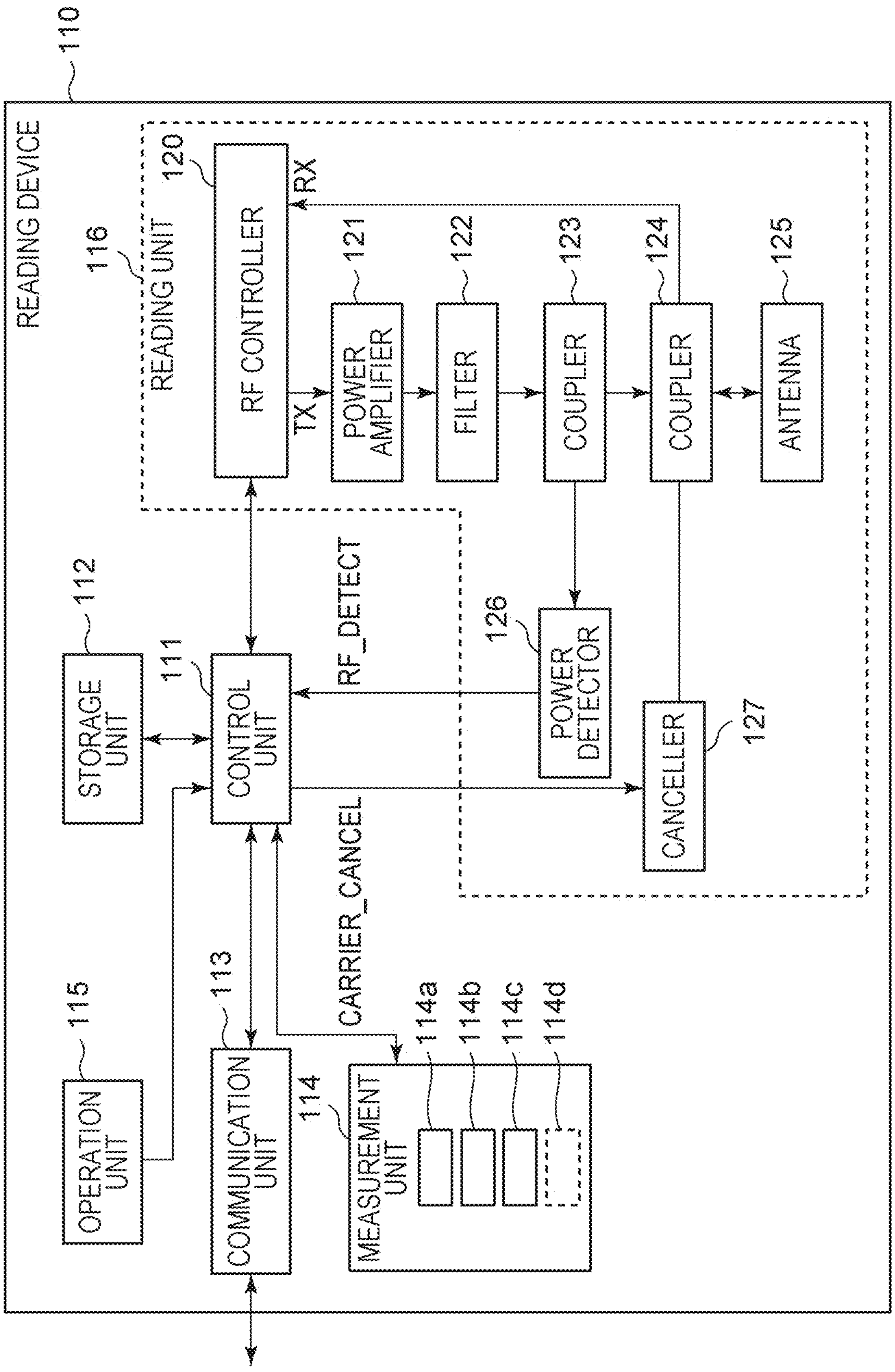
FIG. 2 is a block diagram illustrating an example of the configuration of a tag reader included in a mobile system according to an embodiment.

FIG. 2 is a block diagram illustrating an example of the configuration of the tag reader 110 included in the reading system 100 according to an embodiment. As illustrated in FIG. 2, the tag reader 110 includes a control unit 111, a storage unit 112, a communication unit 113, a measurement unit 114, an operation unit 115, and a reading unit 116.

The control unit 111 includes a memory that stores a computer program, and one or more processors (for example, a central processing unit (CPU)) that run the computer program. The control unit 111 performs overall control on the function of the tag reader 110 described in this specification. For example, the control unit 111 causes the reading unit 116 to execute reading of an RFID tag within a tag reading range, and causes the storage unit 112 to temporarily store read information, reading time, and a signal reception level as reading result data. In addition, concurrently with the reading of the RFID tag, the control unit 111 causes the measurement unit 114 to measure the location of the tag reader 110, and causes the storage unit 112 to store the measurement result. Then, the control unit 111 transmits the reading result data and the measurement result data stored in the storage unit 112 to the management server 200 via the communication unit 113, together with the reader identification information (referred to also as "reader ID") of the own device.

The storage unit 112 may include any kind of a storage medium such as, for example, a semiconductor memory such as a read only memory (ROM) or a random access memory (RAM), an optical disk, or a magnetic disk. In the present embodiment, the storage unit 112 stores the above-described reading result data, the above-described measurement result data, and the above-described reader ID of the tag reader 110.

The communication unit 113 is a communication interface used for the tag reader 110 to communicate with the management server 200. For example, the communication unit 113 may be a wireless local area network (WLAN) interface configured to communicate with a WLAN access point, or a cellular communication interface configured to communicate with a cellular base station. The communication unit 113 may be a connection interface for connection to a relaying device (for example, a Bluetooth® interface or a universal serial bus (USB) interface).

The measurement unit 114 is a unit capable of measuring the location of the tag reader 110. In the present embodiment, the measurement unit 114 measures an amount of relative movement of the tag reader 110 from a certain reference location by using a self-location estimation method also called PDR, and outputs the measured movement amount to the control unit 111. The reference location for the measurement of the relative movement amount may be, for example, the location of the tag reader 110 at the point in time of activation of the tag reader 110. The relative movement amount of the tag reader 110 can be treated as a relative location. For example, the measurement unit 114 includes a triaxial acceleration sensor 114*a*, a gyroscopic sensor 114*b*, and a geomagnetic sensor 114*c*. The triaxial acceleration sensor 114*a* measures an acceleration applied to the tag reader 110 in a device coordinate system unique to the tag reader 110, and outputs first sensor data. The gyroscopic sensor 114*b* measures an angular velocity of the tag reader 110, that is, a change in attitude of the tag reader 110, and outputs second sensor data. The geomagnetic sensor 114*c* measures an azimuth of the tag reader 110 in a real space, and outputs third sensor data. Based on the sensor data outputted from these sensors, the measurement unit 114 performs cumulative calculation of the acceleration while converting the direction of the acceleration of the tag reader 110 into a direction in the coordinate system of the real space; by this means, it is possible to measure the relative movement amount of the tag reader 110. The relative movement amount outputted from the measurement unit 114 to the control unit 111 may be a two-dimensional vector on a horizontal plane or a three-dimensional vector including a height-directional component, too.

As will be described later, in the present embodiment, the position coordinates of the installed location of each of the location tags 40 are known and registered in a database. Therefore, it is possible to estimate the position coordinates of the spot where the tag reader 110 is currently located on the basis of the relative movement amount from the point in time at which the tag reader 110 detected a certain location tag 40 to the current point in time and on the basis of the known position coordinates of this location tag 40. Mainly described in the present embodiment is a case where it is the management server 200 that estimates the absolute location of the tag reader 110; however, the control unit 111 or the measurement unit 114 of the tag reader 110 may access the database and may estimate the absolute location of the tag reader 110.

Also, the tag reader 110 may be disposed in a fixed manner to correspond to the location tag 40. In this case, when the tag reader 110 detects the target tag 50, the management server 200 estimates the position coordinates of the target tag 50 on the basis of the position coordinates of the location tag 40 detected at the same time. Since each of a plurality of location tags is associated with the corresponding one of a plurality of tag readers 110, it is possible to estimate the position coordinates of the target tag 50 without using the self-location estimation method to be described later.

Instead of the above configuration, in which the tag reader 110 includes the measurement unit 114, the reading system 100 may include a measurement device that is not the tag reader 110 (for example, a measurement device capable of measuring the relative movement amount by using the self-location estimation method).

In a certain variation example, the measurement unit 114 may further include an atmospheric pressure sensor 114*d* indicated by a broken-line box in FIG. 2. The atmospheric pressure sensor 114*d* measures atmospheric pressure, and outputs atmospheric pressure data that indicates a measurement value to the control unit 111. In this variation example, the atmospheric pressure data outputted from the atmospheric pressure sensor 114*d* can be used for estimating the height of the spot where the tag reader 110 is currently located.

For example, it is possible to calculate the relative height of the current location from the reference point by multiplying an amount of drop in atmospheric pressure from a pressure value at the reference point to a pressure value at the current location by a predetermined coefficient in a linear atmospheric-pressure-versus-height model. In a case where the reference point lies on the ground, this relative height indicates the height of the current location with respect to the ground. An atmospheric pressure sensor configured to measure atmospheric pressure at the reference point may be additionally provided.

The operation unit 115 receives an operation performed by the user 20. The operation unit 115 includes, for example, a physical input device such as buttons, switches, or levers provided on the housing of the tag reader 110. The operation unit 115 receives an operation performed by the user 20 via the input device, and outputs an operation signal to the control unit 111. The operation unit 115 may include an audio input interface such as a microphone.

The reading unit 116 is a unit capable of reading, from each of the location tags 40 and the target tags 50 that are managed by the process management system 1, information stored in this tag. As illustrated in FIG. 2, the reading unit 116 includes an RF controller 120, a power amplifier 121, a filter 122, a first coupler 123, a second coupler 124, an antenna 125, a power detector 126, and a canceller 127. In accordance with control performed by the control unit 111, the RF controller 120 outputs a transmission signal (for example, a signal modulated in a UHF band) to the power amplifier 121 from a TX terminal. The power amplifier 121 amplifies the transmission signal inputted from the RF controller 120, and outputs the amplified signal to the filter 122. The amplification factor applied to the transmission signal here may be variably controllable. The higher the amplification factor is, the greater the output intensity of an electromagnetic wave emitted from the tag reader 110 is. The filter 122 may be a low-pass filter, for example. The filter 122 removes an unwanted low-frequency component of the transmission signal having been subjected to the amplification by the power amplifier 121. The first coupler 123 splits the transmission signal having passed through the filter 122 to the second coupler 124 and the power detector 126. The second coupler 124 outputs the transmission signal inputted from the first coupler 123 to the antenna 125, and outputs a reception signal inputted from the antenna 125 to the RF controller 120. The antenna 125 sends out the transmission signal inputted from the second coupler 124 into the air in the form of an electromagnetic wave. In addition, the antenna 125 receives a signal returned from an RFID tag that exists within the reading range of the tag reader 110 as a response to the transmission signal, and outputs this reception signal to the second coupler 124. The power detector 126 detects the power level of the signal inputted from the first coupler 123, and outputs a signal RF_DETECT that indicates the detected power level to the control unit 111. The canceller 127 receives a signal CARRIER_CANCEL that indicates the power level of a carrier wave from the control unit 111. Then, based on the signal CARRIER_CANCEL, the canceller 127 cancels a carrier-wave component of the transmission signal, thereby extracting a desired signal component of the reception signal that should be outputted to an RX terminal of the RF controller 120. The RF controller 120 demodulates the signal inputted via the RX terminal to acquire the tag ID and other information returned from the RFID tag, and outputs the acquired information to the control unit 111. In addition, the RF controller 120 measures the reception level of the signal inputted via the RX terminal (referred to also as "reception intensity"), and outputs the measurement result to the control unit 111.

In the present embodiment, the tag reading try can be made by the reading unit 116 periodically (for example, once per second) without requiring any explicit user instructions. The transmission of data from the communication unit 113 to the management server 200 can also be performed periodically (for example, once at intervals of a few seconds) or at each time of tag reading without requiring any explicit user instructions. The control unit 111 may exclude, from data to be transmitted, a record that is the same as a record that has already been transmitted within an immediately preceding predetermined time for the purpose of reducing a load of communication by omitting redundant data transmission. In another embodiment, either the tag reading try by the reading unit 116 or the transmission of data to the management server 200, or both, may be performed upon detecting a user input via the operation unit 115. In a case where the communication unit 113 communicates with the management server 200 indirectly via a relaying device, the transmission of data to the management server 200 may be performed only while a connection between the communication unit 113 and the relaying device is enabled.

2-2. Configuration Example of User Terminal

Figure 3:
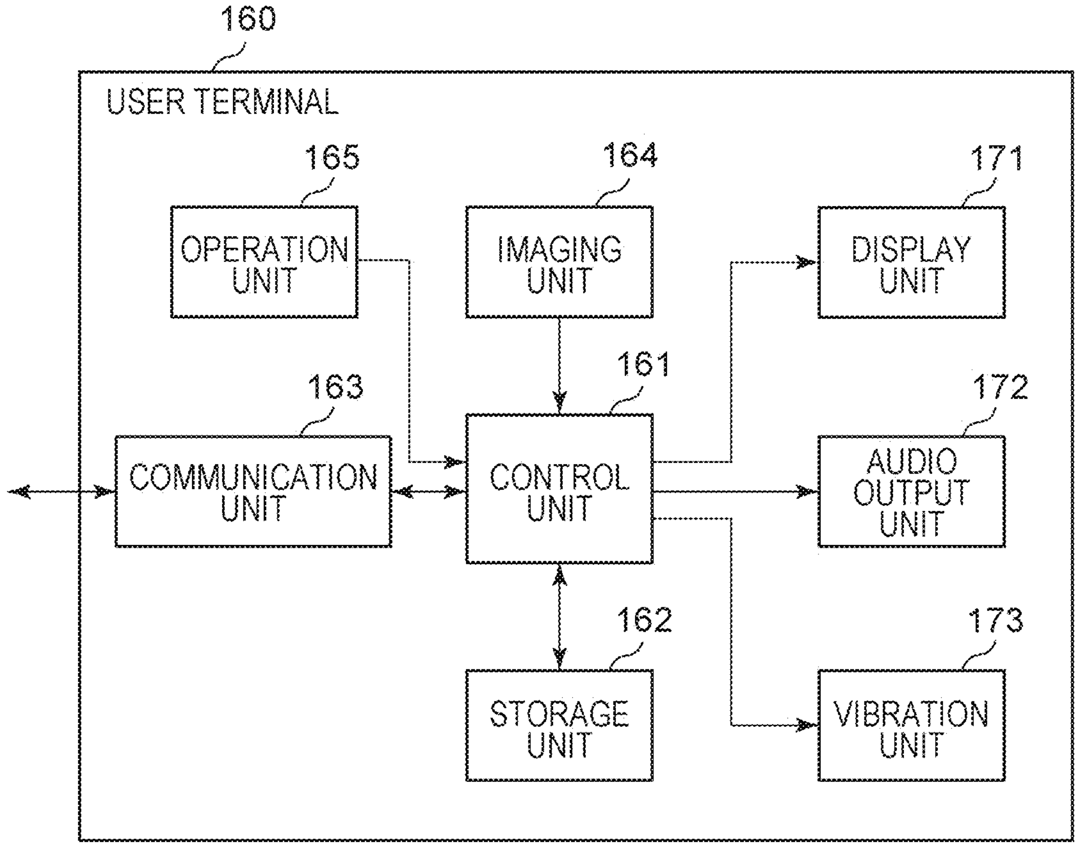
FIG. 3 is a block diagram illustrating an example of the configuration of a user terminal included in the mobile system according to an embodiment.

FIG. 3 is a block diagram illustrating an example of the configuration of the user terminal 160 included in the reading system 100 according to an embodiment. As illustrated in FIG. 3, the user terminal 160 includes a control unit 161, a storage unit 162, a communication unit 163, an imaging unit 164, an operation unit 165, a display unit 171, an audio output unit 172, and a vibration unit 173.

The control unit 161 includes a memory that stores a computer program, and one or more processors that run the computer program. The processor may be a CPU, or an integrated circuit (IC) such as a microcontroller (for example, a single-chip microcontroller). The control unit 161 performs overall control on the function of the user terminal 160 described in this specification. For example, in the process management system 1, when the user 20 wants to browse the location information or the status of the target of management, the control unit 161 causes the display unit 171 to display a screen that presents the requested information. Some examples of the screen displayed to the user 20 will be further described later.

The storage unit 162 may include any kind of a storage medium such as, for example, a semiconductor memory such as a ROM or a RAM, an optical disk, or a magnetic disk. In the present embodiment, for example, the storage unit 162 temporarily stores, for the purpose of screen display, a map image received from the management server 200 that will be described later and information regarding the located place of the target of management.

The communication unit 163 is a communication interface used for the user terminal 160 to communicate with the management server 200. For example, the communication unit 163 may be a WLAN interface or a cellular communication interface. Though not illustrated in FIG. 3, the user terminal 160 may further include a connection interface for connection to a peripheral device (for example, a Bluetooth® interface or a USB interface).

The imaging unit 164 is a so-called camera unit configured to capture an image of a real space and generate still-picture or moving-picture image data. The imaging unit 164 outputs the generated image data to the control unit 161. For example, the image data generated by the imaging unit 164 may be used for optical character recognition (OCR) or for reading a visual code such as a barcode or a QR Code®.

The operation unit 165 receives an operation performed by, and information inputted by, the user 20. The operation unit 165 includes an input device such as, for example, a touch sensor, a keypad, a keyboard, buttons, or a pointing device. The operation unit 165 receives an operation performed by the user 20 via the input device, and outputs an operation signal to the control unit 161. The operation unit 165 may further include another kind of an input device such as an audio input interface such as a microphone, a sensor configured to detect vibrations, or the like.

The display unit 171 displays an image and information. The display unit 171 may be, for example, a liquid crystal display or an organic light-emitting diode (OLED) display. The audio output unit 172 outputs sound/voice. The audio output unit 172 may be, for example, speakers. The vibration unit 173 causes the user terminal 160 to vibrate. The vibration unit 173 may be, for example, a vibrator that includes an eccentric motor.

3. Configuration Example of Management Server

3-1. Basic Configuration

Figure 4:
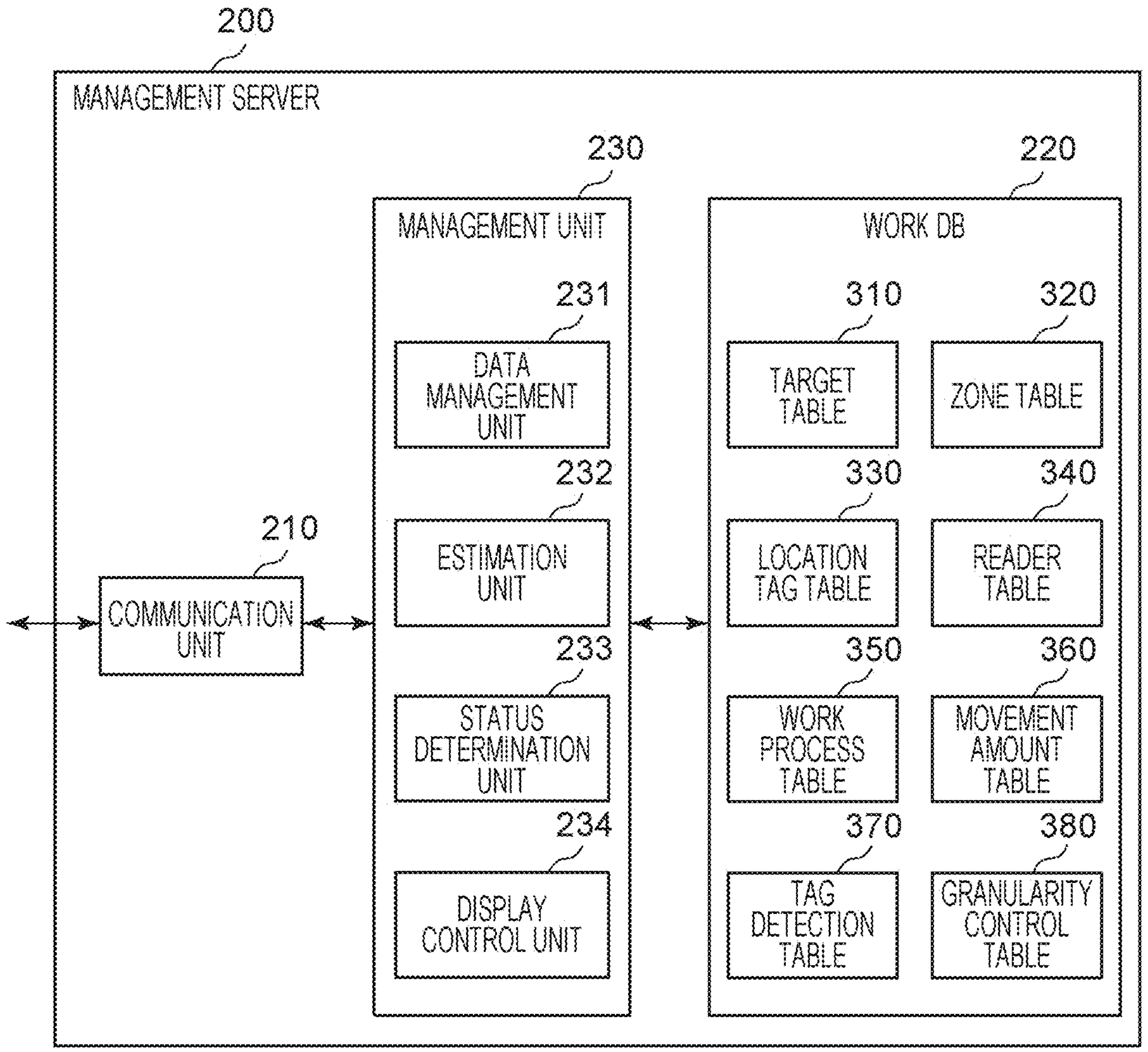
FIG. 4 is a block diagram illustrating an example of the configuration of a management server according to an embodiment.

FIG. 4 is a block diagram illustrating an example of the configuration of the management server 200 according to an embodiment. As illustrated in FIG. 4, the management server 200 includes a communication unit 210, a work database (DB) 220, and a management unit 230.

The communication unit 210 is a communication interface used for the management server 200 to communicate with other devices. The communication unit 210 may be a wired communication interface or a wireless communication interface. In the present embodiment, the communication unit 210 communicates with the reading system 100 (for example, either one or both of the tag reader 110 and the user terminal 160). The work DB 220 is a database that stores various kinds of data for estimating the location of the target of management and managing the progress of the work and is accessible from the management unit 230. In the present embodiment, the work DB 220 includes a target table 310, a zone table 320, a location tag table 330, a reader table 340, a work process table 350, a movement amount table 360, a tag detection table 370, and a granularity control table 380. The management unit 230 is a set of a plurality of software modules configured to perform various kinds of processing related to location estimation and progress management. Each individual software module can be operated by running a computer program stored in a memory (not illustrated) by one or more processors (not illustrated) of the management server 200. In the present embodiment, the management unit 230 includes a data management unit 231, an estimation unit 232, a status determination unit 233, and a display control unit 234.

3-2. Data Management

(1) Target Table

FIG. 5 illustrates an example of the configuration of the target table 310 of the work DB 220. The target table 310 includes six data items that are: tag ID 311, target ID 312, name 313, target type 314, located zone 315, and coordinate 316. The tag ID 311 is identification information for uniquely identifying the target tag 50 attached to each target of management. The value of the tag ID 311 is the same as the value of the tag ID stored internally in the target tag 50 corresponding thereto. The target ID 312 is identification information for uniquely identifying each of the targets of management. The name 313 represents the name of each target of management. In the example illustrated in FIG. 5, a name "material A1" is assigned to the target of management identified by a target ID "IT11". The target type 314 is a mode of type information associated with the target of management. In the example illustrated in FIG. 5, "material A1" and "material A2" are classified the same target type "T1", whereas "material B1" is classified into a target type "T2" different from the target type "T1". The located zone 315 identifies, by the value of the zone ID 321 in the zone table 320 to be described later, the zone where each target of management is estimated to be located among a plurality of zones set in a work space. In the example illustrated in FIG. 5, "material A1" and "material A2" are estimated to be located in the zone identified by a zone ID "AA21", whereas "material B1" is estimated to be located in the zone identified by a zone ID "A000". The coordinate 316 represents the position coordinates of the spot where each target of management is estimated to be located. In this specification, the "located place" of the target of management means the location of this target of management represented by the value of the located zone 315 or by the value of the coordinate 316. The values of the located zone 315 and the coordinate 316 can be updated by the estimation unit 232, upon detection of the movement of the target of management by the tag reader 110, as will be described later.

(2) Zone Table

Figure 8A:
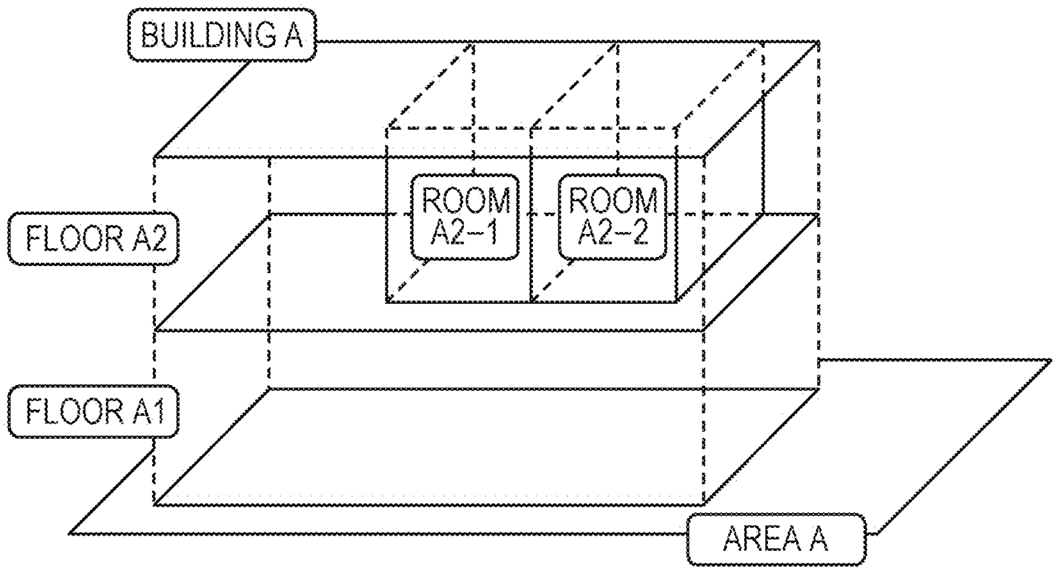
FIG. 8A is a diagram that schematically illustrates an example of setting zones corresponding to the data example of FIGS. 6 and 7A.

FIG. 6 illustrates an example of the configuration of the zone table 320 of the work DB 220. The zone table 320 contains zone data that defines a plurality of zones set in a work space. The zone table 320 includes six data items that are the following: zone ID 321, name 322, parent zone 323, level 324, map image 325, and scale 326. The zone ID 321 is identification information for uniquely identifying each of the plurality of zones. The name 322 represents the name of each zone. In the example illustrated in FIG. 6, a name "area A" is assigned to the zone identified by a zone ID "A000". The parent zone 323 identifies, for a zone of each record, the zone that directly includes this zone in a hierarchical relationship among the plurality of zones set in the work space by the value of the zone ID 321 of another record in the zone table 320. In the example illustrated in FIG. 6, the parent zone for the zone identified by a zone ID "AA00" is "A000". This means that "building A" is included in "area A". In other words, "area A" is the upper level zone that is immediately above "building A". The parent zone 323 may be blank for the uppermost zone in the hierarchical relationship among the plurality of zones. The level 324 is an index of spatial granularity of each zone, and represents the depth of this zone as seen from the uppermost zone in the tree-like hierarchical relationship. In the example illustrated in FIG. 6, "area A" is the parent zone for "building A", "building A" is the parent zone for "floor A2", and "floor A2" is the parent zone for "room A2-1"; accordingly, in this example, the levels of "area A", "building A", "floor A2", and "room A2-1" are 1, 2, 3, and 4, respectively. The map image 325 is a data item for storing map image data when the map image data that is available for use for each zone is registered by the user. The scale 326 represents a ratio for converting an on-the-map distance of the map image 325 into a distance in a real space (for example, a ratio that tells how many meters in the real space one pixel of the image corresponds to). FIG. 8A schematically illustrates an example of a positional relationship among zones that belong to "area A" among the zones defined by the zone data illustrated as the example in FIG. 6.

(3) Location Tag Table

FIG. 7A illustrates an example of the configuration of the location tag table 330 of the work DB 220.

The location tag table 330 includes three data items that are the following: tag ID 331, installed zone 332, and tag location 333. The tag ID 331 is identification information for uniquely identifying the location tag 40 installed in a work space. The value of the tag ID 331 is the same as the value of the tag ID stored internally in the location tag 40 corresponding thereto. The installed zone 332 identifies, by the value of the zone ID 321 in the zone table 320, the zone where each of the location tags 40 is installed. That is, the tag ID of each of the location tags 40 is associated with the installed zone corresponding to this location tag 40 in the location tag table 330. As illustrated in FIG. 7A, for example, a tag ID "TG500" is associated with a zone ID "A000". This means that the location tag 40 identified by the tag ID "TG500" is installed in the zone identified by the zone ID "A000". The tag location 333 represents the position coordinates of the installed location of each of the location tags 40.

Figure 8B:
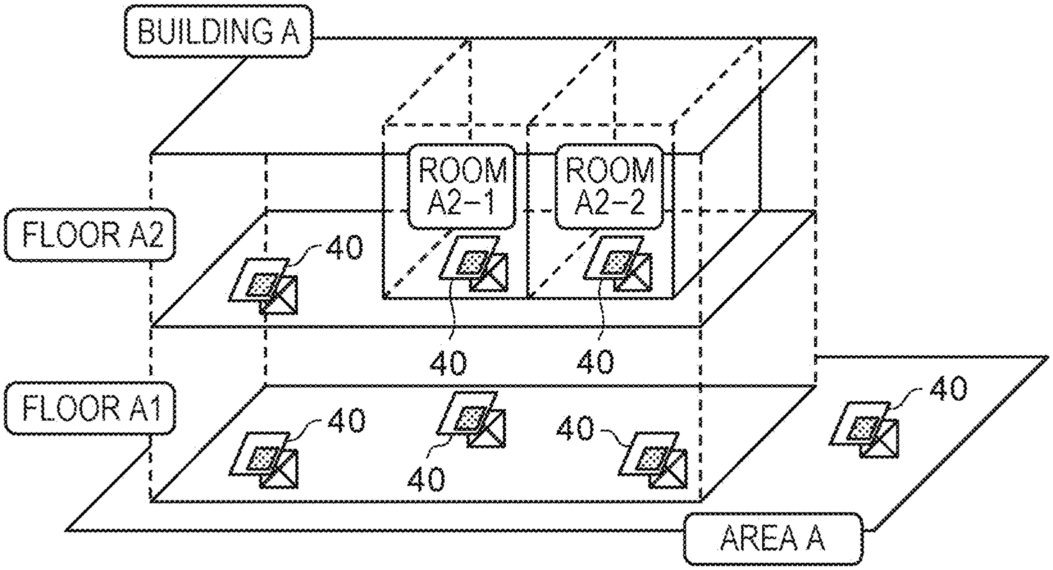
FIG. 8B is a diagram that schematically illustrates an example of the arrangement of location tags therein.

Being premised on the positional relationship among zones illustrated in FIG. 8A, FIG. 8B schematically illustrates an example of the arrangement of the location tags 40 corresponding to the data example of the location tag table 330 illustrated in FIG. 7A.

Walls, floors, and ceilings in buildings like the illustrated one often block wireless signals. Installing the location tag 40 in each of zones partitioned from one another by such shielding entities makes it possible to determine at which zone at which point in time of detection the tag reader 110 is/was located, based on identifying which one of the location tags 40 is/was detected by the tag reader 110. The present embodiment combines such a simple determination of the located zone based on tag reading and a more precise location estimation using the self-location estimation method to be described later. For a relatively wide zone, it could happen that the detectable range of a single location tag 40 is not wide enough to cover the entire area of the zone; therefore, as in "floor A1" of FIG. 8B, two or more location tags 40 could be installed in one zone.

(4) Reader Table

FIG. 7B illustrates an example of the configuration of the reader table 340. The reader table 340 includes three data items that are the following: reader ID 341, name 342, and user 343. The reader ID 341 is identification information for uniquely identifying each of the tag readers 110 used in the system. The name 342 represents each reader name. The user 343 is identification information for uniquely identifying the user 20 who uses each of the tag readers 110. In the example illustrated in FIG. 7B, the tag reader 110 identified by a reader ID "RD01" has a name "reader A" and is used by the user identified by a user ID "UR91".

(5) Work Process Table

FIG. 9 illustrates an example of the configuration of the work process table 350. The work process table 350 is a table that contains data regarding the progress of work that includes at least one work process that involves movement of the target of management. In the present embodiment, the work process table 350 includes process-by-process data (referred to also as "process data") that indicates planned places where the targets of management handled in each work should be located at the time of completion of each of work processes that constitute the work. The work process table 350 includes nine data items that are the following: work ID 351, site 352, process ID 353, due date 354, target 355, planned place 356, process status 357, date of completion 358, and auxiliary status 359. The work ID 351 is identification information for uniquely identifying each work. The site 352 identifies the site where each work is performed by the value of the zone ID 321 of one of the zones set with the coarsest spatial granularity in the zone table 320. The process ID 353 is identification information for uniquely identifying each of work processes that constitute each work. One or more work processes may exist for one work. The due date 354 represents the due date by which each work process must be completed. The target 355 identifies, by the value of the target ID 312 in the target table 310, each target of management handled in each work process. One or more targets of management may be handled in one work process. The planned place 356 represents, by the value of the zone ID 321 in the zone table 320 or by position coordinates, the place where the target of management identified by the value of the target 355 should be located at the time of completion of each work process. The process status 357 represents a status regarding the movement of each target of management in each work process to the planned place. For example, the process status 357 may be a binary flag that indicates whether the movement of each target of management to the planned place has completed or not. The value of the process status 357 can be updated as a result of checking the located place of each target of management against the planned place by the status determination unit 233 as will be described later. The date of completion 358 represents the date on which the movement of each target of management to the planned place is determined to have completed. The auxiliary status 359 represents an auxiliary status settable arbitrarily by the user regarding each target of management in each work process. As will be described later, the auxiliary status 359 may, for example, indicate whether a receiving confirmation regarding the actual presence of each target of management at the planned place (for example, visual confirmation) has been done or not. In this case, the auxiliary status 359 may be called "receiving status". In the example illustrated in FIG. 9, the work identified by a work ID "P1" includes a plurality of work processes identified respectively by process IDs "P11" to "P19". In the work process identified by the process ID "P11", the targets of management identified by target IDs "IT11", "IT12", and "IT21" are scheduled to be moved to the zone identified by the zone ID "AA00". Since the value of the process status 357 for these targets of management is "Completed", one can know that the movement of them has already completed.

(6) Registration of Data

The data management unit 231 manages various kinds of data stored in the work DB 220, such as those described above. Data to be registered into each table of the work DB 220 can be generated by, for example, users or engineers. The data management unit 231 may receive data files in which such data are described via the communication unit 210 and register the data into each table. The map image data of each zone may be, for example, data that is based on computer-aided-design (CAD) drawing. The data management unit 231 may, for example, provide the user terminal 160 with a user interface (UI) for accepting data registration, correction, or deletion.

Figure 10:
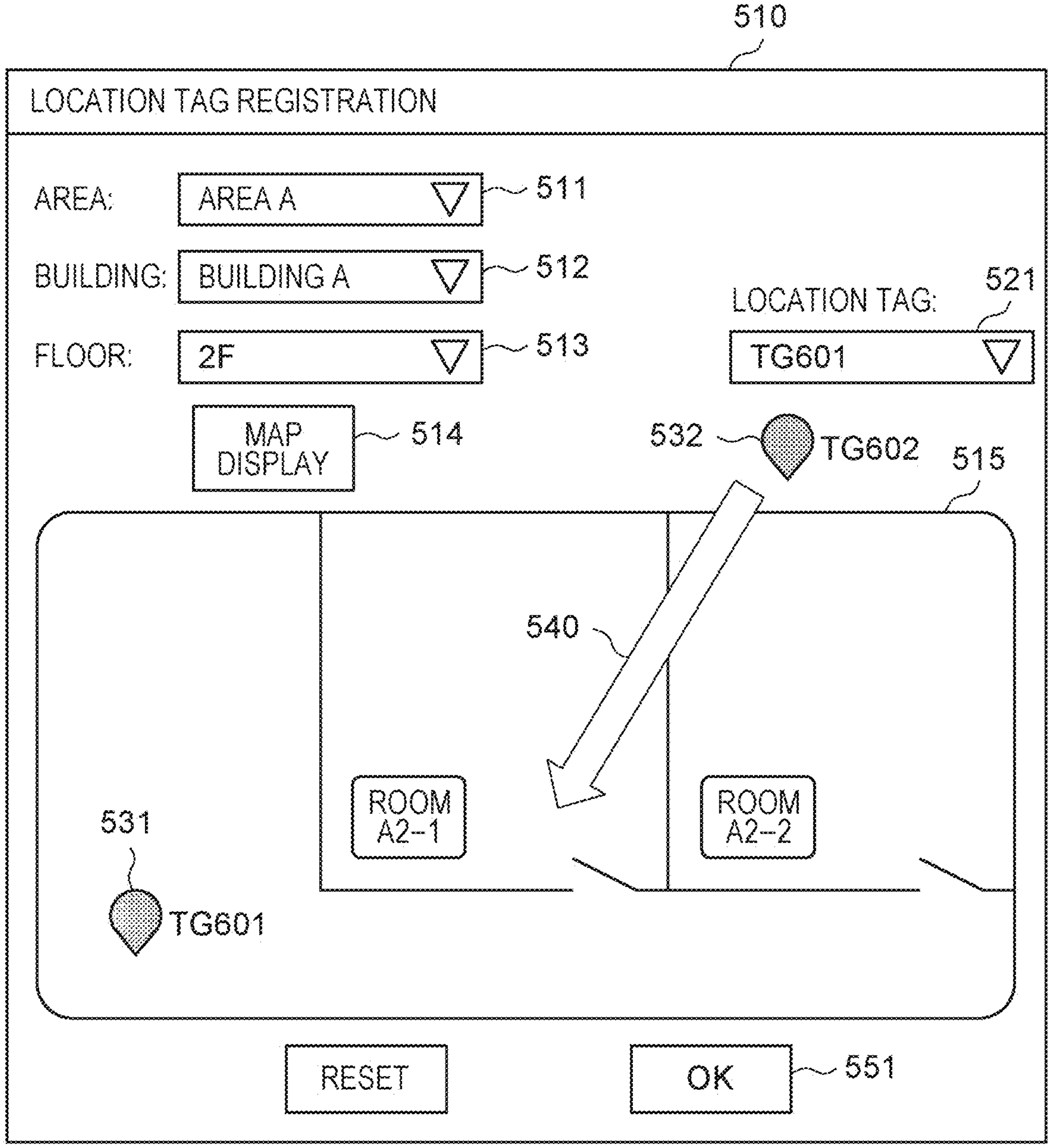
FIG. 10 is a diagram for explaining an example of a user interface (UI) that can be provided for registering the installed location of a location tag.

FIG. 10 is a diagram for explaining an example of a UI that can be provided for registering the installed location of a location tag. A location tag registration screen 510 illustrated in FIG. 10 can be, for example, called up when the user has installed the location tag 40 at a certain spot in the work space and be displayed by the display unit 171 of the user terminal 160. The location tag registration screen 510 includes an area selection field 511, a building selection field 512, a floor selection field 513, a map display button 514, and a map display area 515. The user selects the area, building, and floor of the spot where the user installed the location tag 40 in the respective fields 511, 512, and 513, and then operates (for example, touches or clicks) the map display button 514. Upon this operation, a map image of the floor appears in the map display area 515.

The displayed map image indicates that two rooms are included in this floor, and an icon 531 that represents the location tag 40 that has already been installed and already been registered is superimposed on the map image. The location tag registration screen 510 further includes a location tag selection field 521 and a button 551. When the user selects the tag ID of the location tag 40 that the user has installed anew in the location tag selection field 521, an icon 532 that represents the selected location tag 40 is displayed near the map display area 515. The user specifies the installed location of this new location tag 40 by moving (for example, dragging and dropping) the icon 532 to the spot on the screen where the user has installed this new location tag 40 (see the arrow 540). Then, upon the user operating the button 551, registration information that includes the selected tag ID and the specified installed location is transmitted from the user terminal 160 to the management server 200. Based on the registration information received in this way, the data management unit 231 can register a new record regarding the location tag 40 into the location tag table 330.

Figure 11:
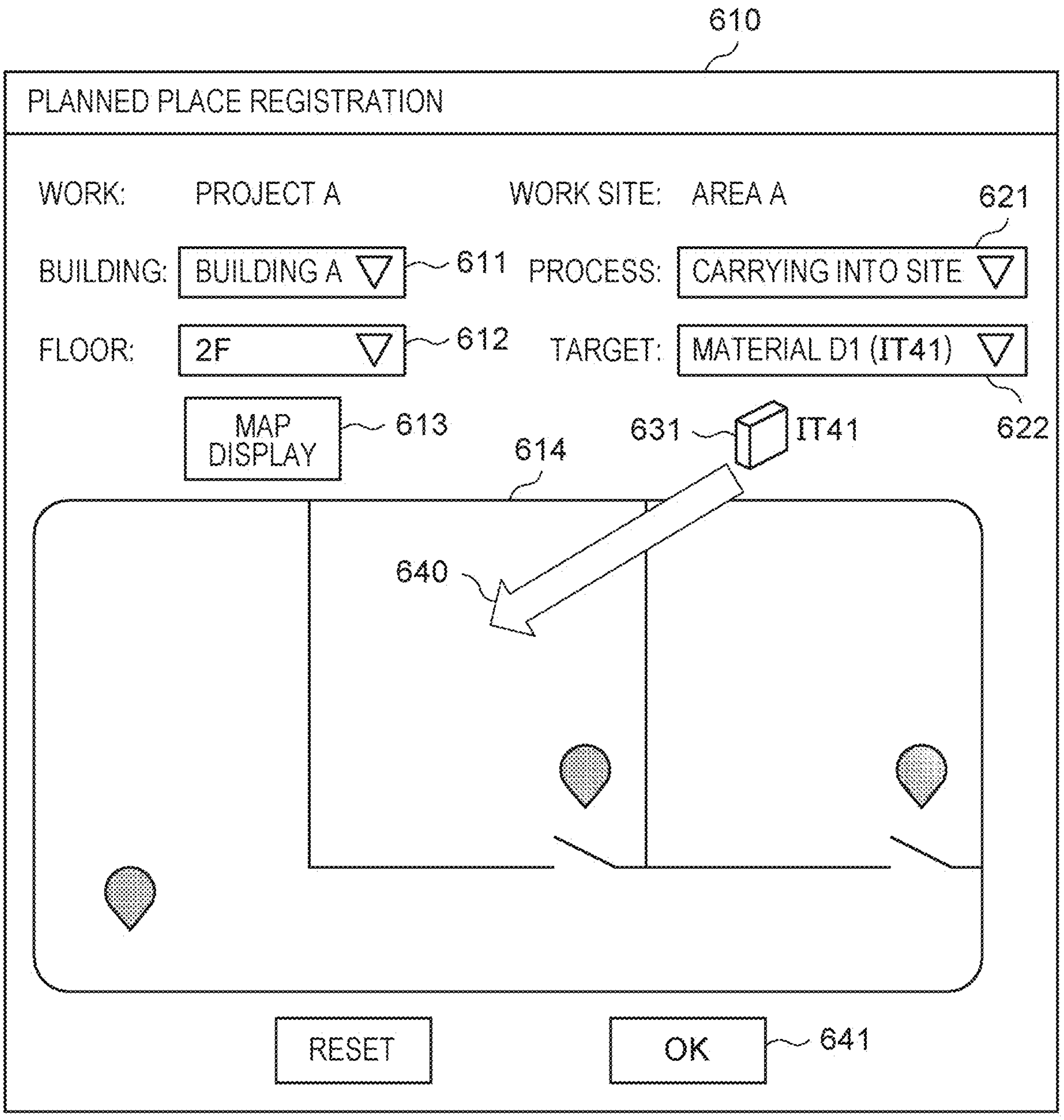
FIG. 11 is a diagram for explaining an example of a UI that can be provided for registering the planned place of the target of management in a certain work process.

FIG. 11 is a diagram for explaining an example of a UI that can be provided for registering the planned place of the target of management in a certain work process. A planned place registration screen 610 illustrated in FIG. 11 can be, for example, called up when a certain work plan has been determined and be displayed by the display unit 171 of the user terminal 160.

The planned place registration screen 610 includes a building selection field 611, a floor selection field 612, a map display button 613, and a map display area 614. The user selects the building and floor of the planned place for which the registration wants to be performed in the respective fields 611 and 612, and then operates the map display button 613. Upon this operation, a map image of the floor appears in the map display area 614. The planned place registration screen 610 further includes a process selection field 621, a target selection field 622, and a button 641. When the user selects the work process for which the registration wants to be performed in the process selection field 621, the targets of management handled in this work process become selectable in the target selection field 622. Then, when the user selects the target of management for which the registration wants to be performed in the target selection field 622, an icon 631 that represents the selected target of management is displayed near the map display area 614. The user specifies the planned place of this target of management in the selected work process by moving the icon 631 to the on-screen planned place that represents the destination to which this target of management should be moved (see the arrow 640). Then, upon the user operating the button 641, registration information that includes the selected target ID, the selected work ID, the selected process ID, and the specified planned place is transmitted from the user terminal 160 to the management server 200. Based on the registration information received in this way, the data management unit 231 can register a planned place corresponding to each combination of a work process and a target of management into the work process table 350.

The configuration of the database managed by the management server 200 is not limited to the configuration described here. Two or more tables having been described above may be merged into one table. One table having been described above may be split into two or more tables. Each table may include an additional data item(s). One or more of the data items having been described above may be omitted.

For example, the target table 310 may include additional data items, such as the manufacturer of the article as the target of management and the owner thereof, and the organization to which the user belongs. Any data item having been described as that of the work process table 350 may be merged into the target table 310. In that case, the target table 310 could contain each pair of data items that indicate a planned place and a process status for each of a plurality of work processes. In place of a plurality of data items representing respective statuses of a plurality of work processes, a single data item that selectively represents one of a plurality of status values related to the plurality of work processes may be adopted (for example, "Process A Completed", "Process B Completed", or the like).

The zone table 320 may include a data item that represents the ground height of each floor. The zone table 320 may include a data item that represents the height above sea level of the ground surface of each area or each building. Such a ground height or a height above sea level may be used when, for example, the height of the spot where a certain target of management is located is calculated from an atmospheric pressure measurement value.

3-3. Estimation of Located Place

Based on the result of reading the tag ID from the target tag 50 by the tag reader 110 (first reading device) and based on the result of reading the tag ID from the location tag 40 by the tag reader 110 that is the identical tag reader, the estimation unit 232 estimates the located place of the target of management to which this target tag 50 is attached. The movement amount table 360 and the tag detection table 370 of the work DB 220 are used for such located place estimation.

(1) Movement Amount Table

FIG. 12A illustrates an example of the configuration of the movement amount table 360. The movement amount table 360 is a table for storing records of measurement result data (hereinafter referred to as "measurement result record") received from the tag reader 110. The movement amount table 360 includes three data items that are the following: measurement time 361, reader ID 362, and movement amount 363. The measurement time 361 represents time when measurement was performed regarding the measurement result shown by each measurement result record. The reader ID 362 represents, by the value of the reader ID 341 of the reader table 340, the tag reader 110 that performed the measurement regarding the measurement result shown by each measurement result record. In the example illustrated in FIG. 12A, six records of the movement amount table 360 represent the results of movement amount measurement that were performed at six different times "ymd1" to "ymd6" by the tag reader 110 identified by the reader ID "RD01". The movement amount 363 represents a relative movement amount as each result of measurement. In this example, the movement amount 363 represents a relative movement amount in the form of a three-dimensional vector in the coordinate system of a work space.

(2) Tag Detection Table

FIG. 12B illustrates an example of the configuration of the tag detection table 370. The tag detection table 370 is a table for storing records of reading result data (hereinafter referred to as "reading result record") received from the tag reader 110. The tag detection table 370 includes four data items that are the following: reading time 371, tag ID 372, reader ID 373, and reception intensity 374. The reading time 371 represents, for each reading result record, the time when the reading of a tag ID was performed. The tag ID 372 represents the read tag ID for each reading result record. The reader ID 373 represents, by the value of the reader ID 341 of the reader table 340, the tag reader 110 that performed the tag reading for each reading result record. In the example illustrated in FIG. 12B, the first record of the tag detection table 370 represents that the tag reader 110 identified by the reader ID "RD01" read a tag ID "TG511" (for example, the tag ID of the location tag 40 of "floor A1") at the time "ymd1". The second record thereof represents that the tag reader 110 read a tag ID "TG011" (for example, the tag ID of the target tag 50 of "material A1") at the time "ymd5". The third record thereof represents that the tag reader 110 read a tag ID "TG021" (for example, the tag ID of the target tag 50 of "material B1") at the time "ymd6". The reception intensity 374 represents the reception level of a signal received by the tag reader 110 at the time of the tag reading for each reading result record.

(3) Estimation of Located Place

Suppose that a certain tag reader 110 reads a tag ID from a certain target tag 50 at a first point in time and reads a tag ID from a certain location tag 40 at a second point in time. The second point in time may be before or after the first point in time. Based on the relative movement amount of the tag reader 110 between the first point in time and the second point in time and based on the known location of the detected location tag 40, the estimation unit 232 is capable of detecting the position coordinates of the located place of the target of management to which the detected target tag 50 is attached.

The estimation unit 232, specifically, adds into the movement amount table 360 each record of the measurement result data received from the reading system 100 via the communication unit 210 as the measurement result record. The estimation unit 232, moreover, adds into the tag detection table 370 each record of the reading result data received from the reading system 100 via the communication unit 210 as the reading result record. When the target tag 50 is detected by the tag reader 110, the estimation unit 232 can estimate the position coordinates (u, v, h) of the spot where the target tag 50 is located at this point in time in accordance with Equation 1 shown below.

$$(u,v,h)=(U_0+(X-X_0),V_0+(Y-Y_0),H_0+(Z-Z_0)) \quad \text{Equation 1,}$$

where (X, Y, Z) denotes the amount of movement of the tag reader 110 at the time of reading the tag ID from the target tag 50;

where $(X_0, Y_0, Z_0)$ denotes the amount of movement of the tag reader 110 at the time of reading the tag ID from the location tag selected as the reference for estimation (hereinafter referred to as "reference location tag"); and where $(U_0, V_0, H_0)$ denotes the known position coordinates of the installed location of the reference location tag.

In the variation example having been described above, instead of employing Equation 1 shown above, the height-directional component H may be calculated by substituting the measurement value of atmospheric pressure into a relational expression that expresses an atmospheric-pressure-versus-height model. The estimation unit 232 updates the cell of the coordinate 316 in the target table 310 with the latest position coordinates of the target of management estimated in this way.

In a case where the same target tag 50 is detected more than once within a certain time period, the estimation unit 232 may estimate the position coordinates of the target of management corresponding thereto on the basis of the relative movement amount of the tag reader 110 at the point in time of the highest signal reception intensity. In a case where the same target tag 50 is detected more than once within a certain time period, the estimation unit 232 may estimate that the target of management corresponding thereto is located at the center (for example, the barycenter) of a plurality of detection positions calculated using the above equation.

Based on a correlation between the result of reading the tag ID from the target tag 50 of a certain target of management and the result of reading the tag ID from one location tag 40 or more, the estimation unit 232 can select the reference location tag that is to be used for estimating the located place of this target of management. The correlation mentioned here may include either one or both of a temporal correlation or a spatial correlation. For example, the estimation unit 232 can focus on each of the location tags 40 in the ascending order of the difference between the tag ID reading times for a certain target tag 50 and can select the location tag 40 that satisfies the following first and second conditions first as the reference location tag.

First Condition: The linear distance between the estimated locations of the tag reader at two reading times is less than a first threshold (threshold determination may be performed separately for a distance on a horizontal plane and for a distance in the height direction); and Second Condition: A cumulative movement distance of the tag reader between two reading times (a total movement amount along the path of the movement) is less than a second threshold.

The estimation unit 232 estimates that the target of management corresponding thereto is located in the zone associated with the tag ID of the reference location tag selected in accordance with the above conditions. That is, the value of the installed zone 332 in the location tag table 330 of the reference location tag selected for the target tag 50 of a certain target of management identifies the located zone of this target of management. The estimation unit 232 updates the cell of the located zone 315 in the target table 310 with the zone ID of the latest located zone of the target of management estimated in this way. For the target of management for which the reference location tag cannot be selected because the location tag 40 that satisfies the above conditions does not exist, the estimation unit 232 may regard its located place unknown and thus may leave its cell of the located zone 315 and its cell of the coordinate 316 blank.

3-4. Updating of Process Status

The status determination unit 233 checks the located place of each target of management estimated on the basis of the result of reading the tag ID from the target tag 50 by the tag reader 110 against the planned place designated by the work process table 350, thereby determining the status of the work process regarding this target of management. In the present embodiment, the status determination unit 233 checks, based on granularity that differs depending on type information associated with each target of management, the located place estimated about this target of management against the planned place for the work process. That is, in the present embodiment, the granularity of checking the located place of each target of management against the planned place (hereinafter referred to also as "collation level") is variable. The granularity control table 380 of the work DB 220 is a table in which mapping between the type information associated with each target of management and the collation level is stored.

For example, assume that the granularity control table 380 defines that the located place should be checked against the planned place at a first level for a certain type. In this case, the status determination unit 233 can determine that, if the located place of the target of management of interest is the same as either a first level zone corresponding to the planned place in a certain work process or any lower level zone belonging to the first level zone, the work process has completed regarding this target of management.

In a first example, the type information that influences the granularity of checking the located place against the planned place includes a target type that indicates the type of each target of management (for example, the value of the target type 314 in the target table 310).

In this case, the status determination unit 233 checks the located place of a first target of management whose target type indicates a first type against the planned place on the basis of first spatial granularity, and checks the located place of a second target of management whose target type indicates a second type different from the first type against the planned place on the basis of second spatial granularity different from the first spatial granularity.

FIG. 13A illustrates an example of the configuration of a granularity control table 380*a* according to the first example. The granularity control table 380*a* according to this example includes three data items that are the following: target type 381, type name 383, and collation level 385. The target type 381 is identification information for uniquely identifying each of the target types that are selectable as the type of the target of management. The type name 383 represents the name of each target type. The collation level 385 represents the granularity of collation that is preset for each target type. The value of the collation level 385 corresponds to the value of the level 324 in the zone table 320, that is, indicates the depth of the collation level in the tree-like hierarchical relationship among the plurality of zones. In the example illustrated in FIG. 13A, the collation level of the target of management classified into a target type "T1" is "2". Therefore, for the target of management classified into the target type "T1", the status determination unit 233 performs collation based on the granularity of a zone the level 324 of which is "2" in the zone table 320. For example, assume that the target type of a certain target of management is "T1", and the planned place of this target of management in a certain work process is "building A". In the example of the zone table 320 illustrated in FIG. 6, the value of the level 324 for "building A" is "2". Therefore, the status determination unit 233 determines that the work process has completed for this target of management in a case where the located zone estimated regarding this target of management is equal to either "building A" or any lower level zone that belongs to "building A".

The lower level zone that belongs to "building A" in this example includes "floor A1", "floor A2", "room A2-1", "room A2-2", and the like.

Articles that fall under a category of so-called general-purpose materials are used for various parts of a building and are interchangeable among those of the same kind; therefore, their destination of movement is often designated with relatively rough granularity when they are moved. By contrast, each non-general-spec dedicated article is premised to be used at a particular spot; therefore, their destination of movement could be designated with relatively precise granularity when they are moved. Articles that play intermediate roles between general-purpose ones and dedicated ones also exist. With the example described above, it is possible to flexibly meet such various requirements in status updating influenced by the type of the article or the type of the target of management.

In another example, the type information that influences the granularity of checking the located place against the planned place includes a process type that indicates the type of each of a plurality of work processes associated with each target of management (for example, the type in the work process table 350). In this case, the status determination unit 233 checks the located place of the target of management against the planned place on the basis of first spatial granularity when updating a status related to a first work process if the process type of the first work process indicates a first type. The status determination unit 233 checks the located place of the target of management against the planned place on the basis of second spatial granularity finer than the first spatial granularity when updating a status related to a second work process if the process type of the second work process indicates a second type different from the first type. Typically, the second work process mentioned here could be a work process that follows the first work process.

FIG. 13B illustrates an example of the configuration of a granularity control table 380*b* according to another example.

The granularity control table 380*b* according to this example includes three data items that are the following: process type 382, type name 384, and collation level 385. The process type 382 is identification information for uniquely identifying each candidate for the type of the work process. The type name 384 represents the name of each process type. In the example illustrated in FIG. 13B, the process type 382 is defined as a character string that represents a pattern of the process ID 353 in the work process table 350, where "x" is to be read with a replacement by any applicable character. For example, a process ID "P11" falls under a process type "Px1" and is categorized into a process type named as "carrying into the site". Similarly, a process ID "P12" falls under a process type "Px2" and is categorized into a process type named as "distribution to floors". In the example illustrated in FIG. 13B, the collation level of the process type labeled as "Px2" is "3". Therefore, the status determination unit 233, when updating the status of the work process identified by the process ID "P12", performs collation based on the granularity of a zone the level 324 of which is "3" in the zone table 320. For example, assume that the planned place of a certain target of management in this work process is "floor A2". In the example of the zone table 320 illustrated in FIG. 6, the value of the level 324 for "floor A2" is "3". Therefore, the status determination unit 233 determines that the work process has completed for this target of management in a case where the located zone estimated regarding this target of management is equal to either "floor A2" or any lower level zone that belongs to "floor A2". The lower level zone that belongs to "floor A2" in this example includes "room A2-1", "room A2-2", and the like.

In many kinds of work such as constructing a building, constructing transportation infrastructure, or setting up an event venue, the place where a relevant article should be located changes as the work progresses. Carrying each individual article into the work site with relatively rough granularity suffices in the first half of the work, whereas it is possible that each individual article is required to have been delivered to a particular place that depends on its intended purpose of use in the second half of the work. With the example described above, it is possible to flexibly meet such various requirements in deployment of the targets of management for each work process.

A combination of the examples having been described above is also conceivable. FIG. 13C illustrates an example of the configuration of a granularity control table 380*c*. In the example illustrated in FIG. 13C, the granularity control table 380*c* includes three data items that are the following: the target type 381, the process type 382, and the collation level 385. Using this the granularity control table 380*c* makes it possible to check the located place of each target of management against the planned place on the basis of granularity that differs depending on the target type and depending on the process type.

In a case where the type information associated with a certain target of management indicates a predetermined type, the status determination unit 233 may check the located place of this target of management against the planned place at the level of position coordinates. For example, the process ID "P19" in the example illustrated in FIG. 9 indicates the predetermined type mentioned here.

In the work process table 350, three-dimensional position coordinates (u5, v5, h5) are registered in the cell of the planned place 356 for the target of management associated with the process ID "P19". In this case, the status determination unit 233 can determine that the work process has completed for this target of management in a case where the distance between the position coordinates estimated regarding this target of management and the position coordinates (u5, v5, h5) as the position coordinates of the planned place is less than a distance threshold. Adopting this precise collation at the level of the position coordinates instead of relying on the located zone makes it possible to automatically determine whether or not a particular article (for example, a dedicated article) has been installed or fixed at the designed place in a certain work process and to reflect the determination result into the status.

In accordance with the method described in this section, the status determination unit 233 checks the latest located place of each target of management handled in each work process with the planned place, and updates, into "Completed", the value of the process status 357 for the target of management determined to have been moved to the planned place appropriately.

3-5. Presentation of Location Information

The display control unit 234 is capable of causing the display unit 171 of the user terminal 160 to display information regarding each of a plurality of targets of management for the purpose of assisting the user in grasping the located place of the target of management and confirming a status about it. Among others, in the present embodiment, a work space is regularly segmented into a plurality of coordinate areas (referred to also as "grid") so as to make it possible to get a big picture of, or a rough understanding of, the located place of the target of management. The display control unit 234 is capable of commanding display of, on the screen, coordinate area information regarding the coordinate area to which the position coordinates estimated for each target of management belong. In addition, the display control unit 234 is capable of commanding display of, on the screen, located zone information regarding the located zone estimated for each target of management. Since the display control unit 234 is capable of controlling display of such information regarding the target of management, the process management system 1 may be referred to also as the display control system 1.

Figure 14:
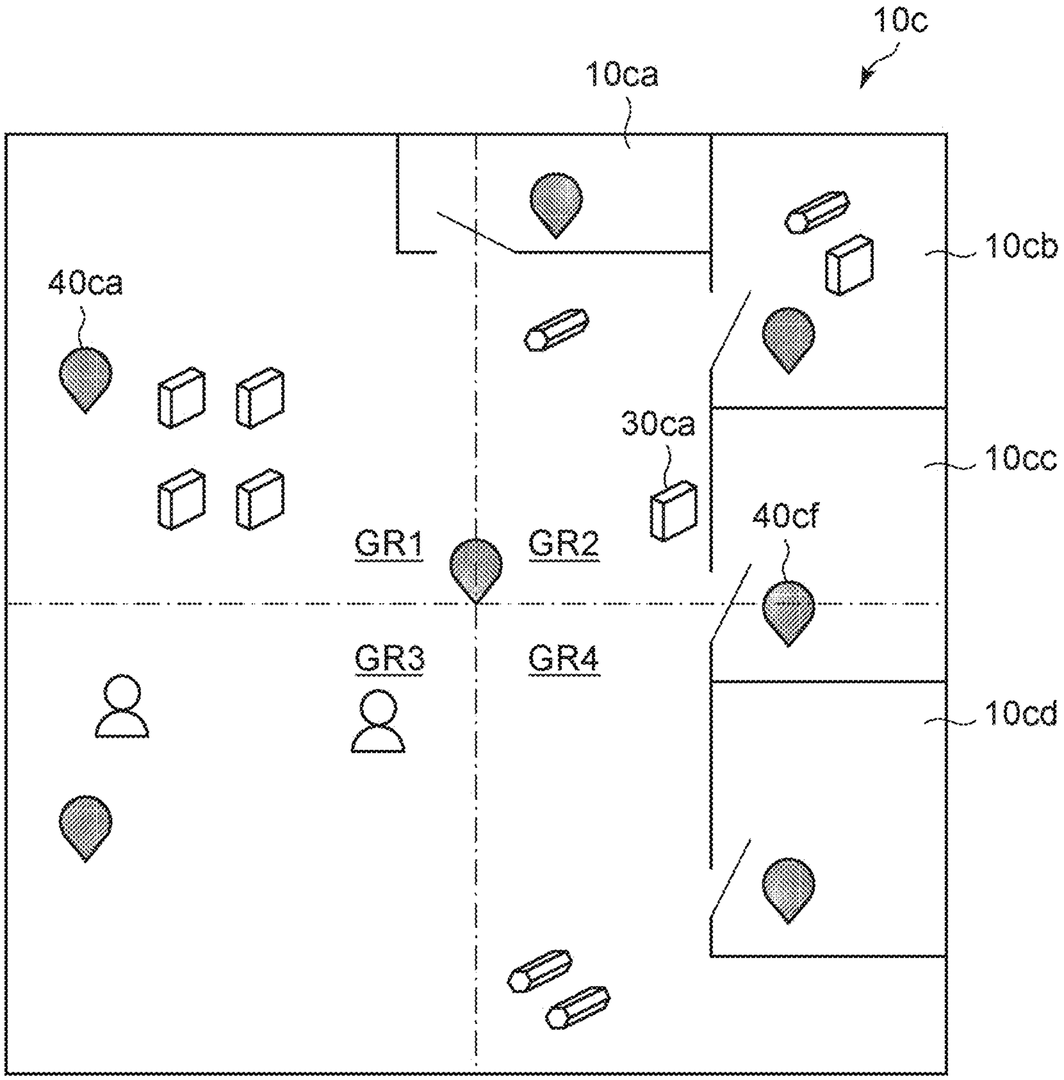
FIG. 14 is a diagram for explaining an example of a plurality of coordinate areas.

FIG. 14 illustrates an example of a plurality of coordinate areas set in a work space. A zone 10*c* illustrated in FIG. 14 corresponds to one floor in a certain building. The zone 10*c* includes zones 10*ca*, 10*cb*, 10*cc*, and 10*cd* corresponding respectively to rooms on the floor. In the illustrated example, quadrangular coordinate areas GR1 to GR4 in a 2×2 layout, four in total, are set regularly in the zone 10*c*. These coordinate areas may have a uniform shape, and the pitch of borderlines between the coordinate areas may be constant on each coordinate axis. The borderlines between the coordinate areas are indicated by dot-and-dash lines in the illustrated example. These borderlines may be in alignment with borderlines between sub zones (the zones 10*ca*, 10*cb*, 10*cc*, and 10*cd*) indicated by thick lines in the space illustrated therein, or may be not in alignment therewith as illustrated in FIG. 14.

The number of the coordinate areas set in the work space, and the size of the coordinate area, are not limited to those in the example illustrated in FIG. 14. The size of the coordinate area may be preset in a fixed manner. Instead, the display control unit 234 may set the size of the coordinate area into a different value that depends on the size of the zone to be displayed. Also, the display control unit 234 may set the size of the coordinate area variably in accordance with a user setting (for example, a setting specified by a user input, or a setting written in a setting file stored by the user). This enables the user to browse the coordinate area information to be described later in various granularities suitably for the purpose of browsing.

In FIG. 14, icons that represent the installed locations of a plurality of location tags (for example, location tags 40*ca* and 40*cf*) installed in the zone 10*c* are also illustrated. In addition, icons that represent the estimated locations of a plurality of targets of management (for example, an article 30*ca*) located in the zone 10*c* are also illustrated. For example, the article 30*ca* is located near the door to the zone 10*cc*, though outside the zone 10*cc*. For this reason, if the location tag 40*cf* installed in the zone 10*cc* and the target tag attached to the article 30*ca* are detected in a short time by the tag reader 110 that goes past the door to the zone 10*cc*, there is a risk that the located zone of the article 30*ca* might be recognized as the zone 10*cc* erroneously.

Coordinate-area-based information display to be described below is beneficial in that does not suffer such erroneous recognition of the located zone.

Figure 15:
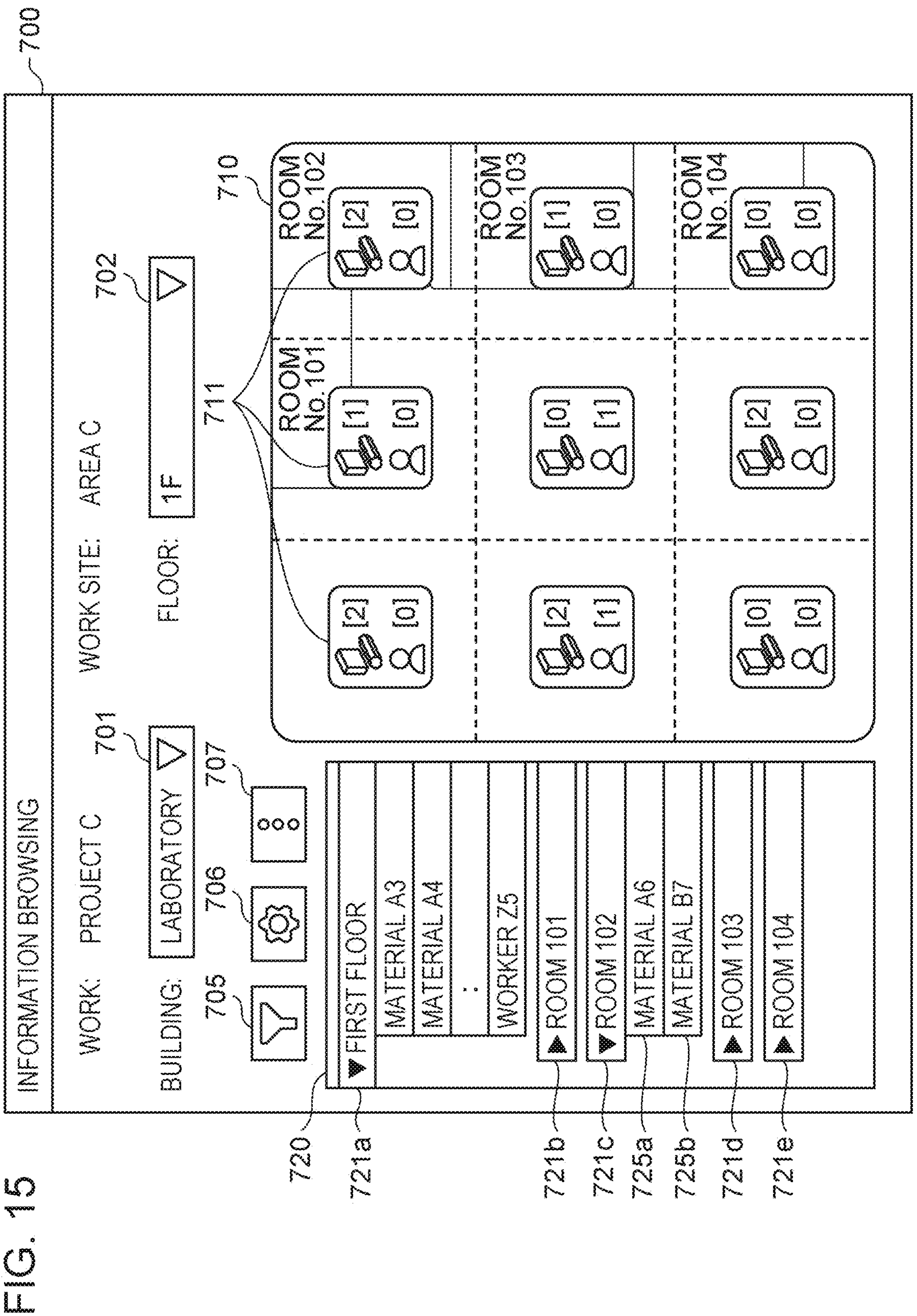
FIG. 15 is a diagram for explaining an example of the configuration of an information browsing screen.

FIG. 15 illustrates an example of the configuration of an information browsing screen 700 that can be presented by the display control unit 234 in the present embodiment. The information browsing screen 700 can be, for example, called up in response to a user input made via the operation unit 165 of the user terminal 160 and can be displayed by the display unit 171 of the user terminal 160. As illustrated in FIG. 15, the information browsing screen 700 includes a building selection field 701, a floor selection field 702, function buttons 705, 706, and 707, a map display area 710, and a list display area 720. Upon the user selecting the building and floor whose location information the user wants to view in the fields 701 and 702 respectively, a map image of the selected floor appears in the map display area 710. The display control unit 234 superimposes borderlines (indicated by broken lines in the figure) that represents the borders of a plurality of coordinate areas on this map image, and further superimposes coordinate area information thereon. In the example illustrated in FIG. 15, coordinate areas in a 3×3 layout, nine in total, are set on the selected floor.

As an example, the coordinate area information displayed on the screen may include statistical information regarding the target(s) of management estimated to be located in each coordinate area. For example, the statistical information mentioned here may include one or more of the following items of information:

1) The number of the targets of management estimated to be currently located in each coordinate area;
2) The categorized-by-type number of the targets of management estimated to be currently located in each coordinate area;
3) The number of the targets of management that were estimated to be located in each coordinate area within a certain period in the past;
4) The categorized-by-type number of the targets of management that were estimated to be located in each coordinate area within a certain period in the past; and
5) Any of the numbers 1) to 4) satisfying particular filtering conditions.

The filtering conditions could include one or more of, for example, a condition related to the target of management, a condition related to the work process, and a condition related to the tag reader that detected the target of management. For example, the condition related to the target of management could include a condition related to the name of the target of management or the target type.

The condition related to the work process could include a condition related to the process ID, the due date, the planned place, the process status, the date of completion, and the auxiliary status. The condition related to the tag reader could include a condition of limitation to the targets of management detected by the particular tag reader only (for example, the tag reader used by the login user).

The function button 705 of the information browsing screen 700 is a button for calling up a UI for allowing the user to specify the filtering conditions described above. Since such a UI may be configured using any known method, a detailed explanation of it is not given here. In the example illustrated in FIG. 15, a box 711 is superimposed on each of nine coordinate areas of the map display area 710. Each of the boxes 711 shows the number of articles and the number of users that are currently located in the coordinate area corresponding thereto. Presenting such coordinate-area-by-coordinate-area statistical information enables the user to easily and quickly have a rough idea of the located places of the targets of management at the latest point in time or at the point in time specified by the user. Moreover, it is possible to avoid the congestion of pieces of information on the screen in a situation where many targets of management exist.

As illustrated in FIG. 15, the display control unit 234 may present parallel display of coordinate area information in a first section (the map display area 710) of the information browsing screen 700 and located zone information in a second section (the list display area 720) of this screen. As an example, the located zone information could include a list of the targets of management estimated to be located in each zone. In the example illustrated in FIG. 15, the list display area 720 includes list items 721*a*, 721*b*, 721*c*, 721*d*, and 721*e* that are expandable and collapsible. The list item 721*a* corresponds to "floor 1F" selected in the floor selection field 702. The list items 721*b*, 721*c*, 721*d*, and 721*e* correspond to four rooms on the "floor 1F" respectively. Upon the user operating any of the list items 721, a list of the targets of management located in the zone corresponding to the operated list item 721 is displayed (Upon the user operating the same list item 721 again, the displayed list of the targets of management disappears). In the example illustrated in FIG. 15, the list item 721*c* corresponding to "Room 102" is expanded, and list items 725*a* and 725*b* corresponding to two articles located in "Room 102" are displayed. Presenting the above-described parallel display of coordinate area information and located zone information enables the user to take a closer look to know where in the work space which of the targets of management is located while comparing two different patterns of display with each other.

The function button 706 is a button for calling up a UI that enables the user to change the settings related to information display. The function button 707 is a button for calling up a UI that enables activation of some kind of an auxiliary function. Since these UIs may be configured using any known method, a detailed explanation of them is not given here. The settings related to information display could include, for example, the size of a coordinate area described above. The auxiliary function could include, for example, downloading an at-a-glance data file regarding the displayed targets of management.

Unlike the example illustrated in FIG. 15, the located zone information may include statistical information regarding the targets of management estimated to be located in each zone. For example, the statistical information mentioned here may include one or more of the following items of information:

1) The number of the targets of management estimated to be currently present in each zone;
2) The categorized-by-type number of the targets of management estimated to be currently present in each zone;
3) The number of the targets of management that were estimated to be present in each zone within a certain period in the past;
4) The categorized-by-type number of the targets of management that were estimated to be present in each zone within a certain period in the past; and
5) Any of the numbers 1) to 4) satisfying particular filtering conditions.

The filtering conditions mentioned here may be the same as the conditions having been described above regarding the coordinate area information.

Figure 16:
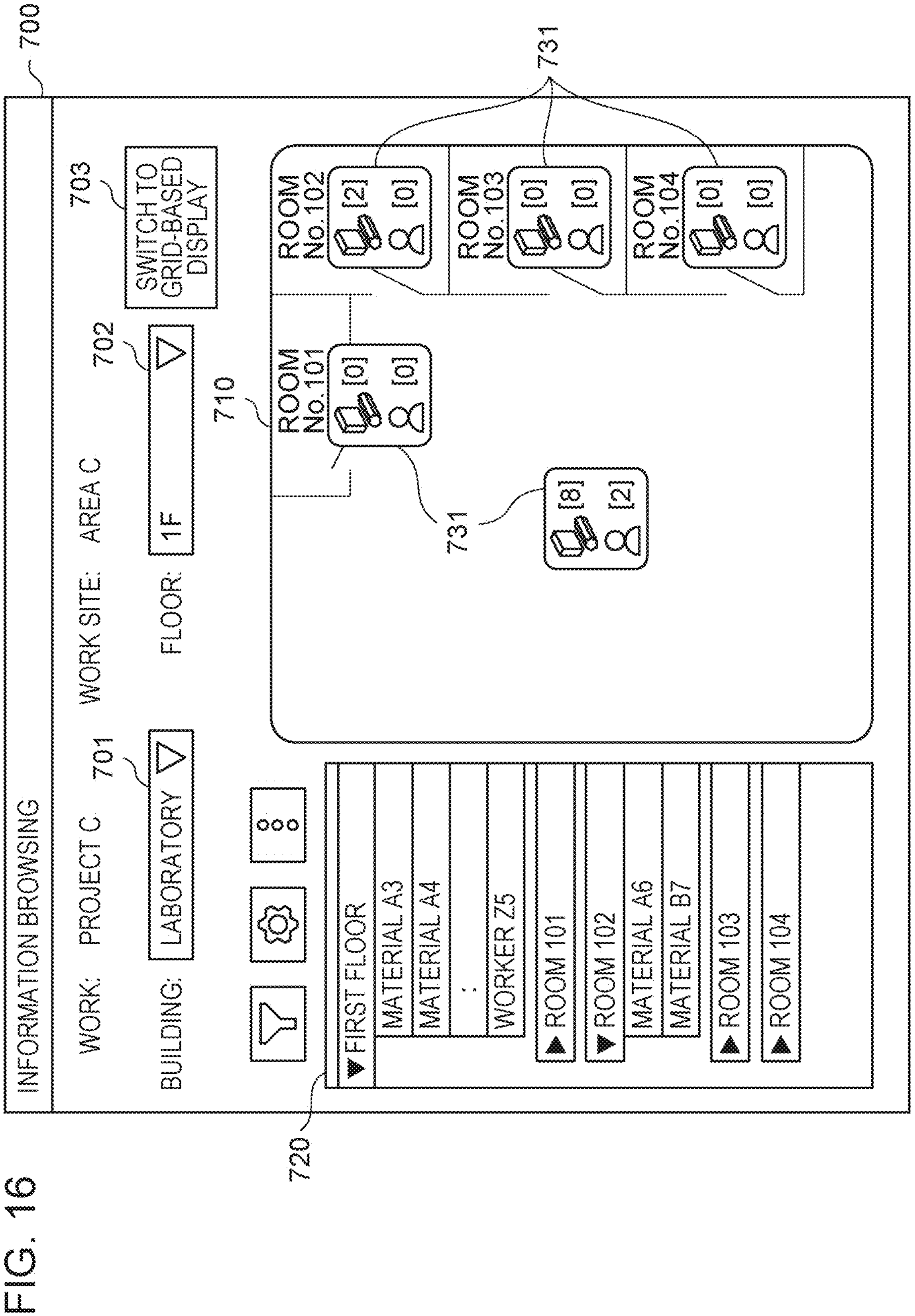
FIG. 16 is a diagram for explaining an example of the configuration of an information browsing screen.

FIG. 16 illustrates a second example of the configuration of the information browsing screen 700 that can be presented by the display control unit 234 in the present embodiment. In the second example, in accordance with a selection made by the user, the display control unit 234 presents superimposed display of either one of coordinate area information and located zone information on a map image in the map display area 710. As illustrated in FIG. 16, the information browsing screen 700 includes a display switching button 703 in addition to the elements having been described regarding FIG. 15. The display switching button 703 is a button for switching information to be displayed in the map display area 710 between coordinate area information and located zone information. For example, when the user operates the display switching button 703 with coordinate area information displayed in the map display area 710, the display control unit 234 commands that located zone information be displayed in place of the coordinate area information in the map display area 710.

When the user operates the display switching button 703 with located zone information displayed in the map display area 710, the display control unit 234 commands that coordinate area information be displayed in place of the located zone information in the map display area 710. In the example illustrated in FIG. 16, the borderlines between the coordinate areas are deleted in the map display area 710, the boxes 711 are also deleted, and, instead, five boxes 731 are superimposed on the map image. Each of the boxes 731 shows the number of articles and the number of users that are currently present in the zone corresponding thereto.

Having been described above is an example in which a selection can be made between a first display mode of superimposing coordinate area information on a map image and a second display mode of superimposing located zone information on the map image; however, a third display mode of superimposing individual position coordinates of the target of management may be further selectable.

In the third display mode, for example, the display control unit 234 can arrange icons that represent the targets of management respectively at, in the map display area 710, positions corresponding to the targets of management that satisfy the specified filtering conditions.

In general, position coordinates relying on a self-location estimation method are susceptible to the influence of cumulative errors in sensor output and thus sometimes fail to pick up the location of the target of management accurately. Therefore, by making located zone information displayable in the map display area 710 in accordance with a user selection as in the example illustrated in FIG. 16, it is possible to furnish the user with useful information and effectively assist the user in grasping the located places of the targets of management even in a case where precision in position coordinates is not high enough.

Figure 17:
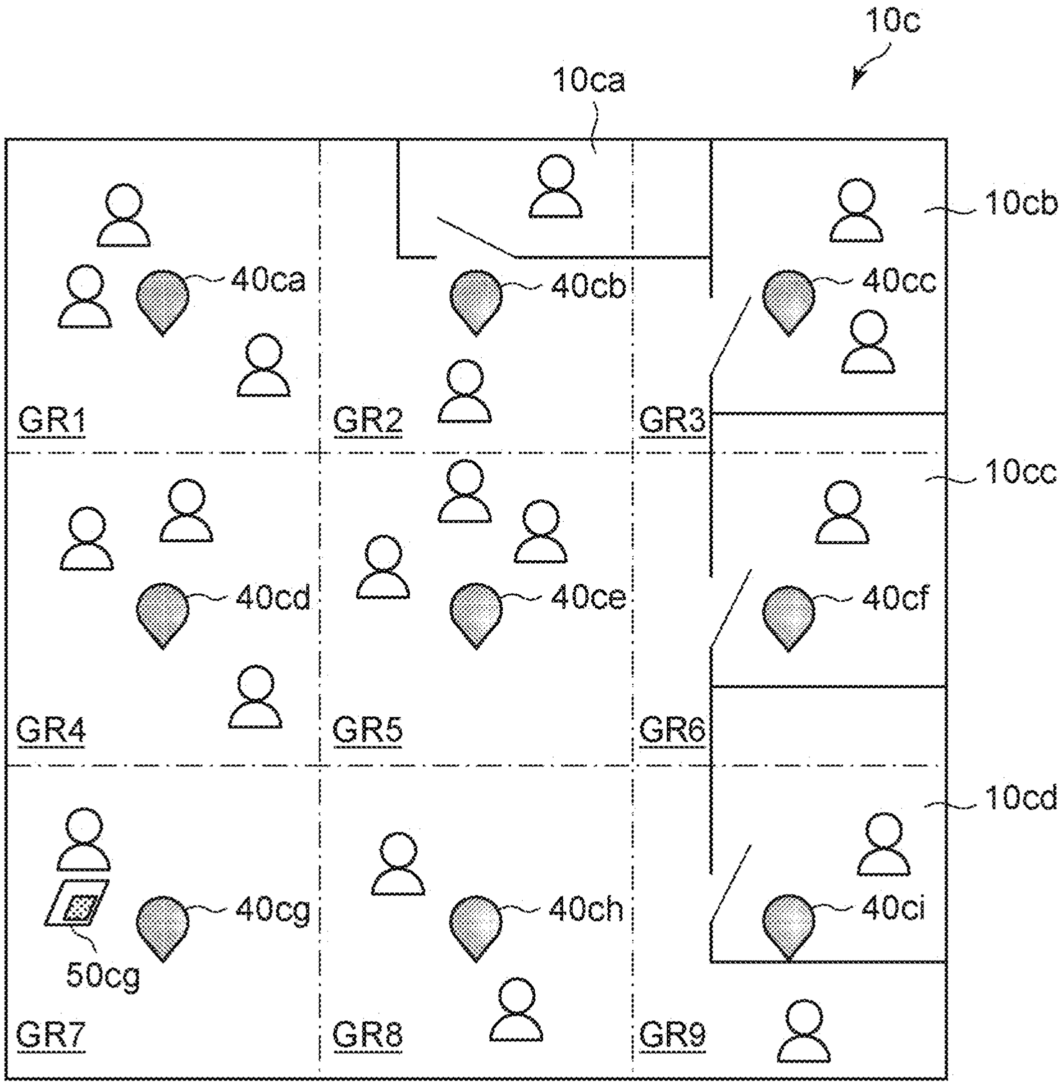
FIG. 17 is a diagram for explaining an example of a plurality of coordinate areas.

FIG. 17 illustrates an example of a plurality of coordinate areas set in a work space. The zone 10*c* illustrated in FIG. 17 corresponds to one floor in a certain building, similarly to FIG. 14. In FIG. 17, location tags are arranged in quadrangular coordinate areas GR1 to GR9 in a 3×3 layout, nine in total. With the arranged location tags taken as a reference, any plurality of coordinate areas are combined together to be managed as a block area. A block area can be set by, for example, associating "TG512" and "TG513" with a block area 1 in the location tag table 330 of the work DB 220 in FIG. 7A.

Setting a block area is effective for, for example, grasping the whereabouts of articles, persons, and the like on an event site.

Figure 18:
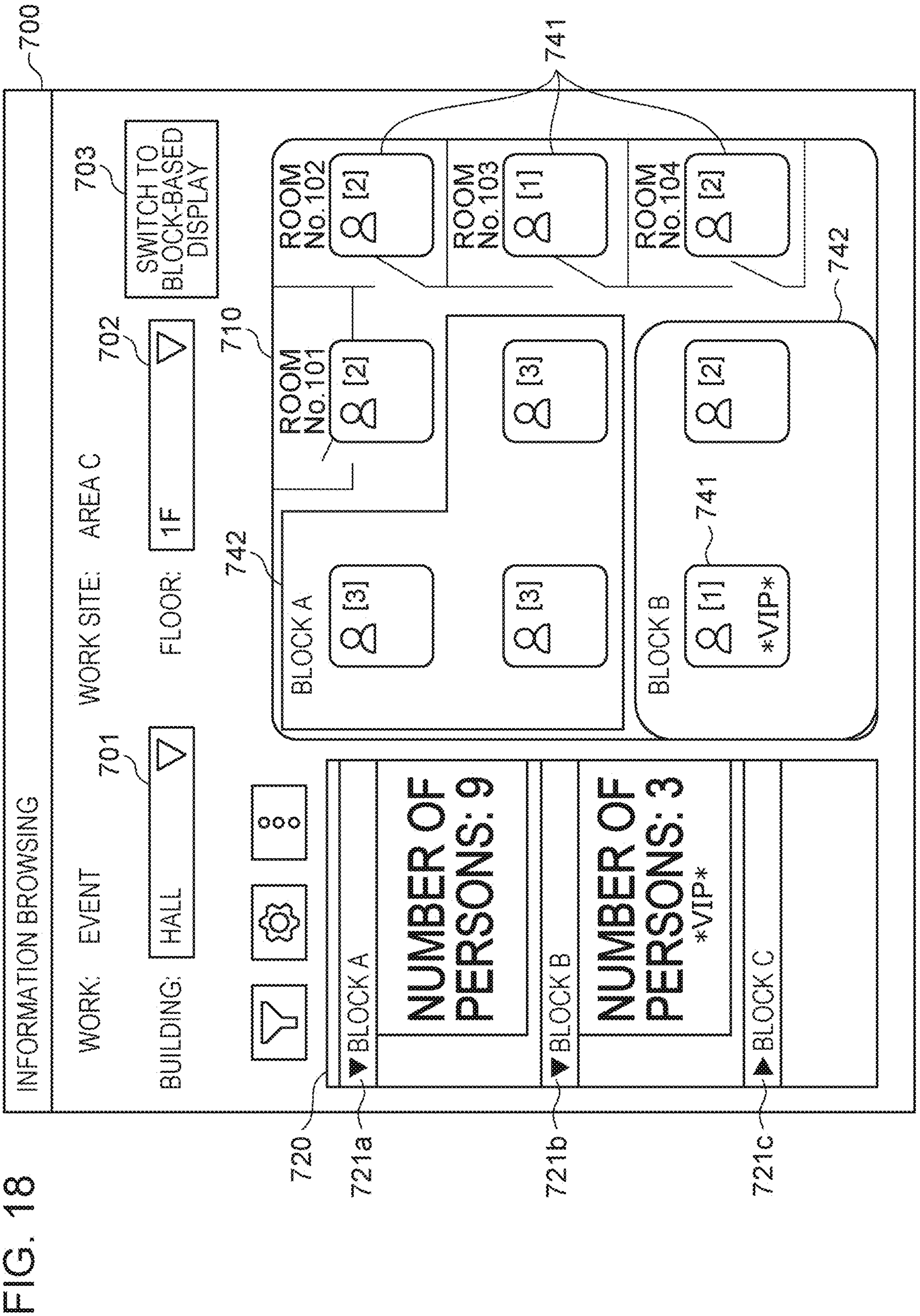
FIG. 18 is a diagram for explaining an example of the configuration of an information browsing screen.

FIG. 18 illustrates an example of block area display in the configuration of the information browsing screen 700 that can be presented by the display control unit 234. A block area is set as a block made up of any two or more of the nine 3×3 coordinate areas in FIG. 17. For example, coordinate areas GR1, GR4, and GR5 in FIG. 17 are set as a block area A. In other words, the tag IDs of location tags 40*ca*, 40*cd*, and 40*ce* are associated with the block area A in the location tag table 330 of the work DB 220. Similarly, coordinate areas GR7 and GR8 in FIG. 17 are set as a block area B. In other words, the tag IDs of location tags 40*cg* and 40*ch* are associated with the block area B in the location tag table 330 of the work DB 220. Similarly, coordinate areas GR2, GR3, GR6, and GR9 in FIG. 17 are set as a block area C. In other words, the tag IDs of location tags 40*cb*, 40*cc*, 40*cf*, and 40*ci* are associated with the block area C in the location tag table 330 of the work DB 220.

As shown in the information browsing screen 700, block area information 742 and boxes 741 are displayed in the first section (the map display area 710) thereof. The box 741 corresponds to each of the location tags 40 and displays the total of the detected targets of management at the timing of detecting each of the location tags 40. In the example illustrated in FIG. 18, with an event venue in mind, the total of the targets of management represents the number of users. In the example illustrated in FIG. 17, there is one-to-one correspondence between each coordinate area and each location tag, and statistical information is presented in units of coordinate areas.

In the example illustrated in FIG. 18, the block area information 742 is not displayed for the block area C, which includes the zones 10*ca*, 10*cb*, 10*cc*, and 10*cd* corresponding to actual rooms on the floor in the coordinate areas. Depending on the user's use, block area display may be superimposed on a map image. List display of the targets of management estimated to be present in each block area may be performed in parallel in the second section (the list display area 720) of this screen. In the example illustrated in FIG. 18, the list display area 720 includes list items 721*a*, 721*b*, and 721*c* that are expandable and collapsible. The list item 721*a* corresponds to "block area A". The list item 721*b* corresponds to "block area B". The list item 721*c* corresponds to "block area C". Each list item shows statistical information regarding the targets of management displayed in each block area. Presenting the above-described parallel display of block areas and block area information enables the user to take a closer look to know where in the work space which of the targets of management is located while comparing two different patterns of display with each other.

A priority display setting may be made on a particular target tag 50. For example, a target tag 50*cq* with a priority display setting is assigned to a particular person on an event venue. The display control unit 234 displays a sign or characters indicating priority display in the corresponding box 741 (in the example illustrated in FIG. 18, "VIP"). This makes it possible to intuitively know the whereabouts of the person "VIP" on the floor.

Figure 19:
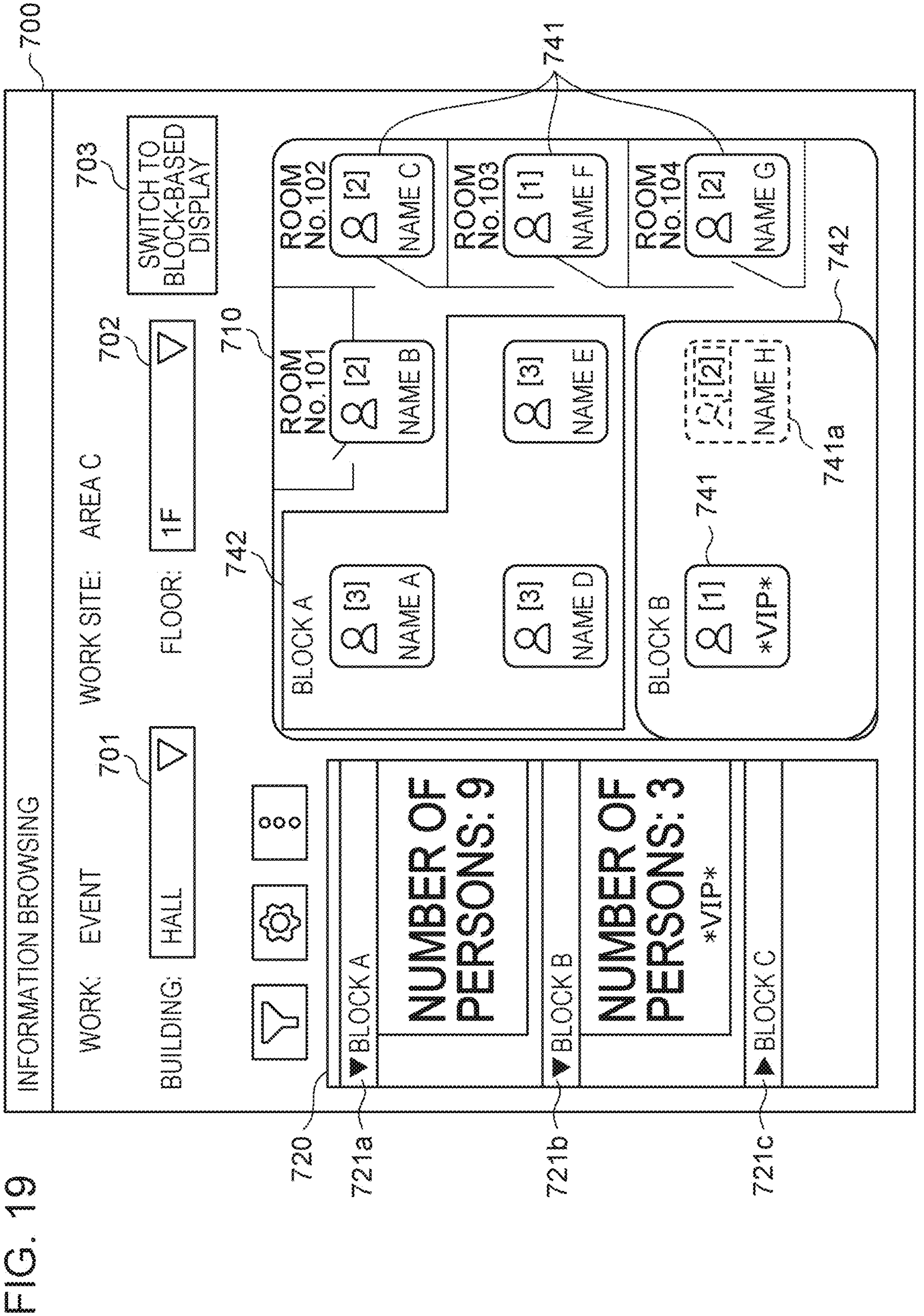
FIG. 19 is a diagram for explaining an example of the configuration of an information browsing screen.

As illustrated in FIG. 19, the name of the target tag 50 in the box 741 may be displayed. As illustrated in FIG. 5, each target of management identified by its target ID has its name. This name information may be displayed in the box 741. In a case where a plurality of targets of management is present in one box, representative one of their names is displayed. Degrees of priority may be set in the target table 310 to determine which one of the targets of management should be given a priority for display in the box 741.

As illustrated in FIG. 19, in a case where highlighted display of the target of management that is a newly detected target is wanted, for example, its box (741*a* in FIG. 19) may be displayed in a highlighted manner.

4. Flow of Processing

In this chapter, with reference to the flowcharts of FIGS. 20 to 24, some examples of the flow of processing that can be performed in the process management system 1 will be described. In the description below, each processing step will be abbreviated as S (step).

4-1. Data Transmission Processing

Figure 20:
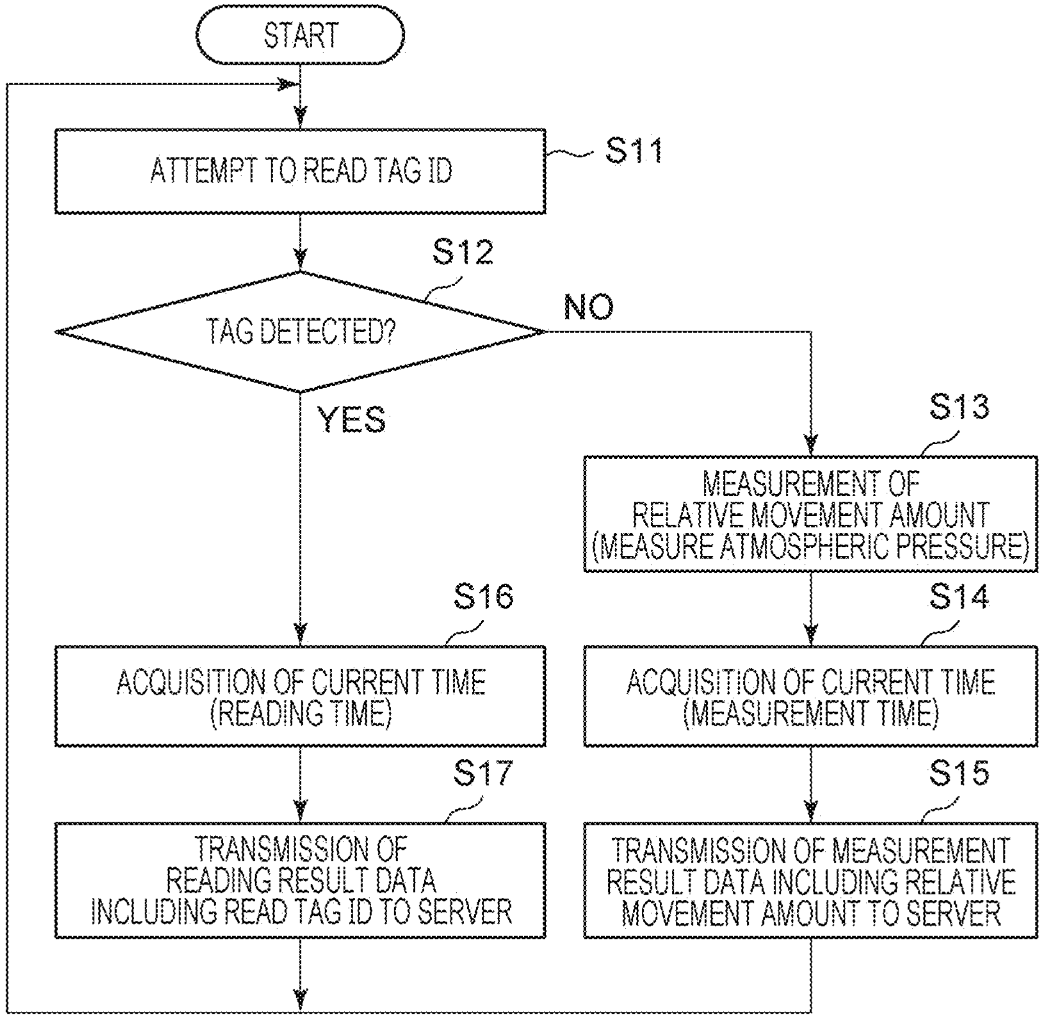
FIG. 20 is a flowchart illustrating an example of the flow of data transmission processing according to an embodiment.

FIG. 20 is a flowchart that illustrates an example of the flow of data transmission processing performed by the reading system 100.

First, in S11, the reading unit 116 of the tag reader 110 makes a try at reading a tag ID from a nearby RFID tag by emitting an electromagnetic wave within its reading range. If the tag ID is received from the nearby RFID tag by using the energy of the electromagnetic wave as the result of this tag reading try (S12: YES), the process proceeds to S16. If the tag ID is not received (S12: NO), the process proceeds to S13.

In S13, for example, based on sensor data outputted from the triaxial acceleration sensor, the gyroscopic sensor, and the geomagnetic sensor, the measurement unit 114 of the tag reader 110 measures the relative movement amount of the tag reader 110. The measurement unit 114 may cause the atmospheric pressure sensor to measure atmospheric pressure. Next, in S14, the control unit 111 acquires the current time as the measurement time by, for example, looking up an internal real time clock. Next, in S15, the control unit 111 transmits measurement result data that includes the relative movement amount (and the atmospheric pressure value) measured by the measurement unit 114, the measurement time, and the reader ID of the tag reader 110 to the management server 200 via the communication unit 113.

In S16, the control unit 111 acquires the current time as the reading time of the tag ID. Next, in S17, the control unit 111 transmits reading result data that includes the read tag ID, the reading time, the reception level, and the reader ID of the tag reader 110 to the management server 200 via the communication unit 113.

After that, the process returns to S11. The data transmission processing described above is performed iteratively while the try at reading the tag ID by the reading system 100 is active.

4-2. Located Place Estimation Processing

Figure 21:
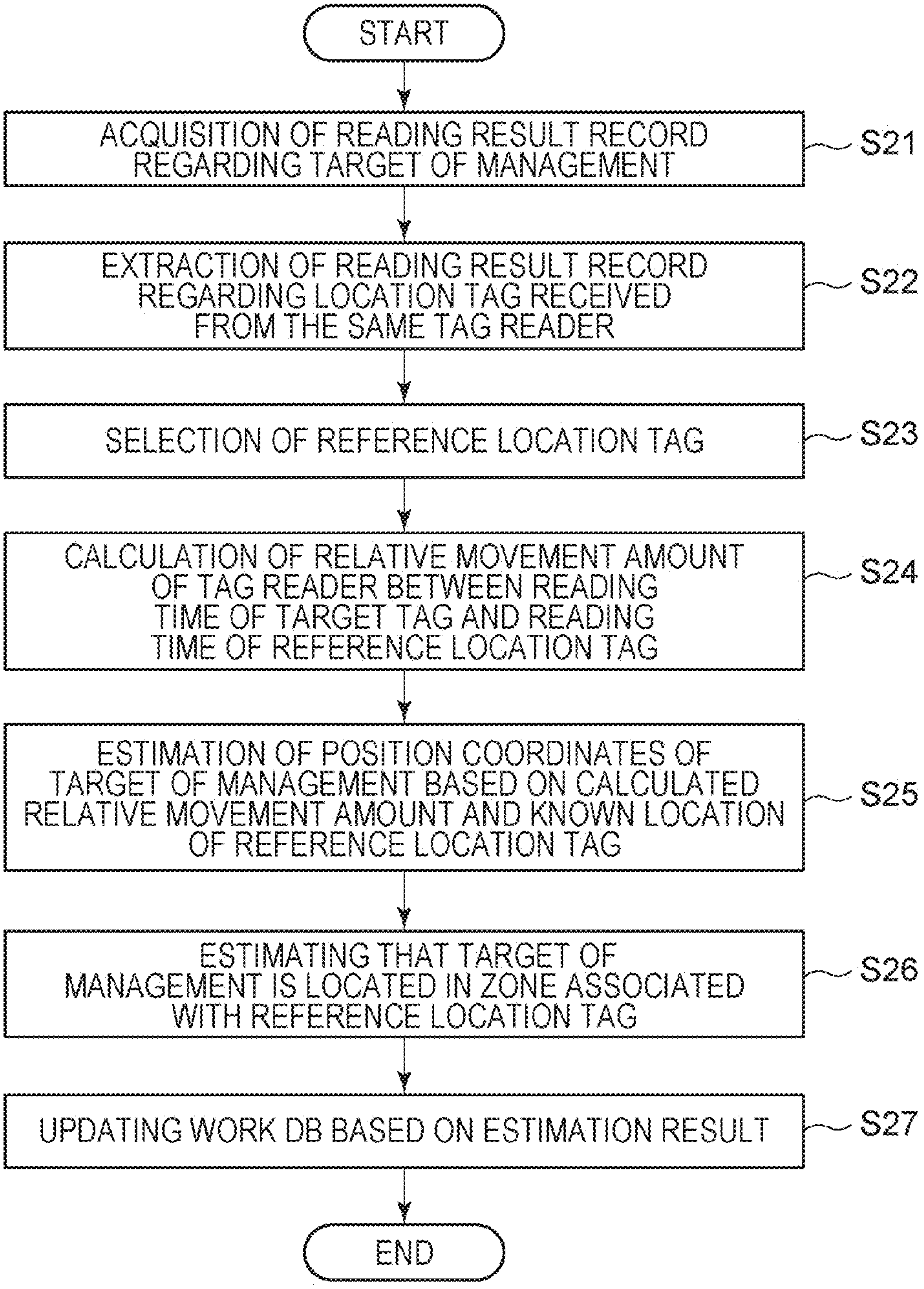
FIG. 21 is a flowchart illustrating an example of the flow of located place estimation processing according to an embodiment.

FIG. 21 is a flowchart that illustrates an example of the flow of located place estimation processing performed by the management server 200. It is assumed that, at the point in time at which the located place estimation processing is started, some measurement result records are stored in the movement amount table 360, and some reading result records are stored in the tag detection table 370.

First, in S21, focusing on one target of management, the estimation unit 232 of the management server 200 acquires a reading result record regarding the target tag 50 attached to this target of management from the tag detection table 370. Next, in S22, the estimation unit 232 extracts, from the tag detection table 370, a reading result record regarding one or more location tags 40 received from the same tag reader 110 as that of the acquired reading result record. Next, in S23, based on a correlation between the reading result record regarding the target tag 50 and the reading result record regarding the one or more location tags 40, the estimation unit 232 selects one reference location tag that should be taken as a reference for located place estimation.

Next, in S24, the estimation unit 232 calculates the relative movement amount of the tag reader 110 between the reading time of the target tag 50 and the reading time of the reference location tag by referring to the measurement result record in the movement amount table 360. Next, in S25, based on the calculated relative movement amount of the tag reader 110 and the known location of the reference location tag, the estimation unit 232 estimates the position coordinates of the target of management of interest. In addition, in S26, the estimation unit 232 estimates that the zone associated with the reference location tag in the location tag table 330 is the located zone of the target of management of interest.

Then, in S27, the estimation unit 232 updates the cell of the coordinate 316 and the cell of the located zone 315 in the target table 310 with the coordinate value of the position coordinates estimated in S25 and with the zone ID of the located zone estimated in S26, respectively.

The estimation unit 232 can repeat the above-described processing while sequentially focusing on each of one or more targets of management that might have moved within a certain time period. Performing the above-described processing periodically makes it possible to keep the location information that indicates the located place of each target of management up to date in the work DB 220.

4-3. Status Update Processing

Figure 22:
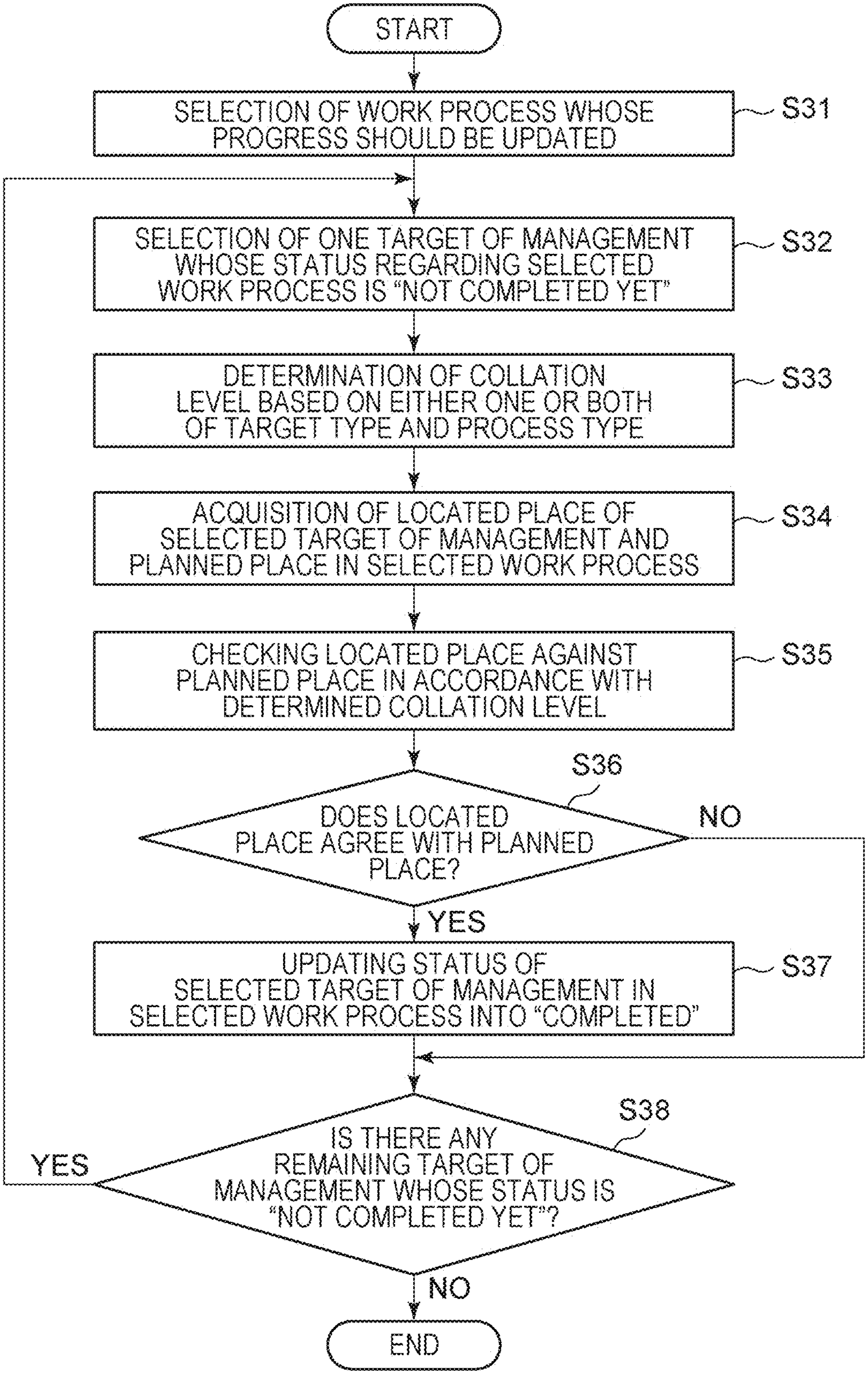
FIG. 22 is a flowchart illustrating an example of the flow of status update processing according to an embodiment.

FIG. 22 is a flowchart that illustrates an example of the flow of status update processing performed by the management server 200. The status update processing illustrated in FIG. 22 may be, for example, performed periodically as is the case with the located place estimation processing illustrated in FIG. 21, or may be performed in response to an input of status update instructions via the user terminal 160.

First, in S31, the status determination unit 233 selects a work process whose progress should be updated among work processes that constitute a work defined in the work process table 350. The work process selected here may be, for example, a work process associated with the target of management whose located place has changed, a work process designated by the user, or a work process that is due. Next, in S32, the status determination unit 233 selects one target of management whose status regarding the selected work process is "Not completed yet".

Next, in S33, based on either one or both of the target type of the selected target of management and the process type of the work process, the status determination unit 233 determines a collation level for checking the located place against the planned place by looking up the granularity control table 380. Next, in S34, the status determination unit 233 acquires the latest located place (located zone or position coordinates) of the selected target of management from the target table 310. In addition, the status determination unit 233 acquires the planned place of the selected target of management in the selected work process from the work process table 350.

Next, in S35, the status determination unit 233 checks the located place of the selected target of management against the planned place in accordance with the collation level determined in S33. For example, assuming that the planned place is represented by the zone ID and further assuming that the level of its zone is equal to the collation level, the located place can be determined to agree with the planned place if the zone ID of the located zone of the target of management is equal to the zone ID of either the planned place or any lower level zone belonging to the planned place. The located place, in a case where the planned place is represented by its position coordinates and where the collation level indicates position-coordinate-level collation, can be determined to agree with the planned place if the distance between the position coordinates of the target of management and the position coordinates of the planned place is less than a predetermined distance threshold. If the located place agrees with the planned place (S36: YES), in S37, the status determination unit 233 updates the status of the selected target of management in the selected work process into "Completed". If the collation fails (S36: NO), S37 is skipped, and the status is not updated.

Next, in S38, the status determination unit 233 determines whether or not there is any remaining target of management whose status regarding the work process selected in S31 is "Not completed yet". If there is any remaining target of management whose status is "Not completed yet", the process returns to S32, and the status determination unit 233 selects a target of management whose status is "Not completed yet" from among the remaining targets of management and then repeats S33 to S38. If there is no remaining target of management whose status is "Not completed yet", the status update processing for the work process selected in S31 ends. Though not illustrated, of course, the above-described status update processing may be repeated for other work processes.

4-4. Display Control Processing

Figure 23:
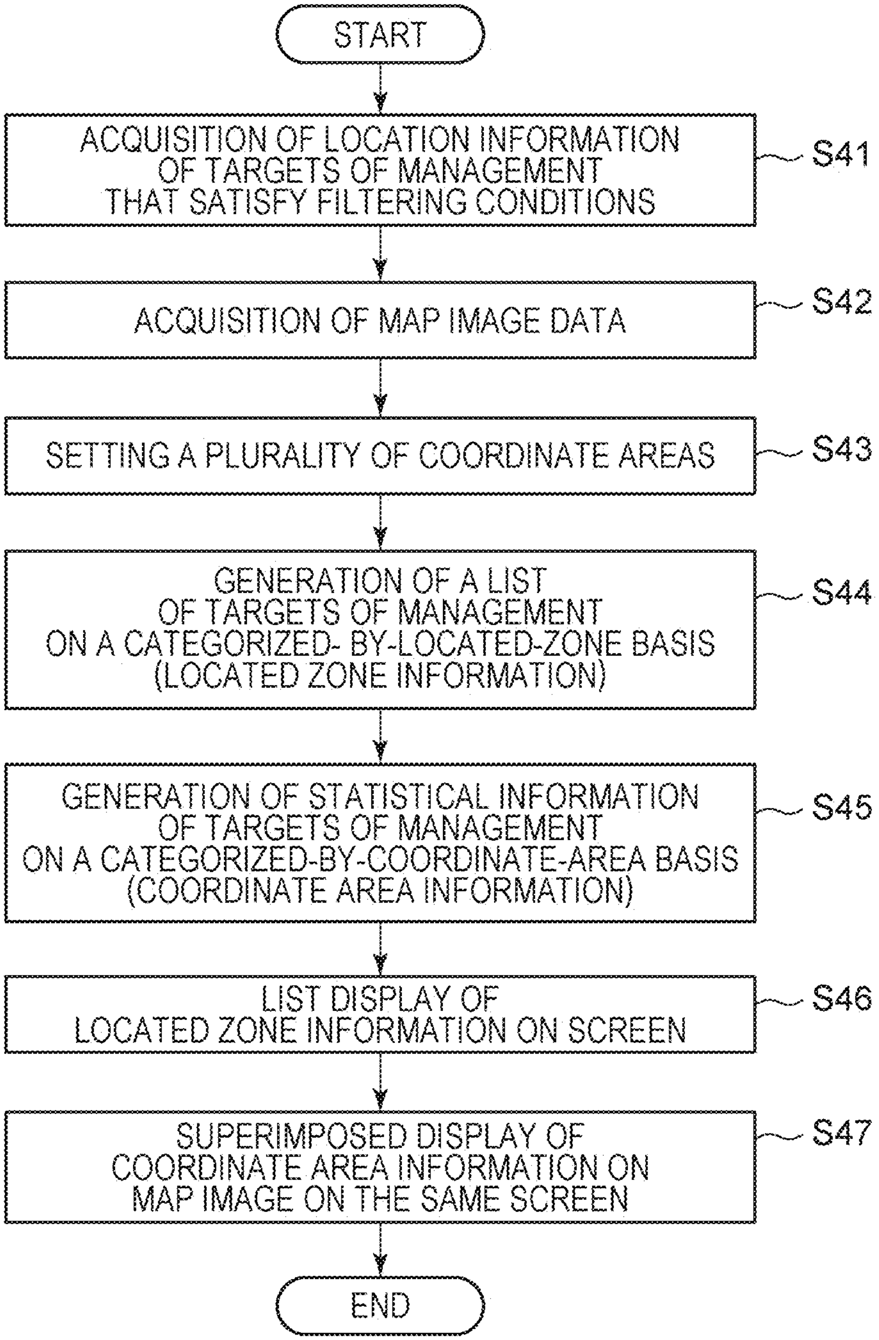
FIG. 23 is a flowchart illustrating a first example of the flow of display control processing according to an embodiment.

FIG. 23 is a flowchart that illustrates an example of the flow of display control processing performed by mutually cooperative operation of the user terminal 160 and the management server 200. It is assumed here that the information browsing screen 700 according to the example having been described with reference to FIG. 15 is called up by the user and is displayed by the display unit 171 under the control by the control unit 161 of the user terminal 160.

First, in S41, the display control unit 234 of the management server 200 acquires, from the target table 310, the location information of one or more targets of management that satisfy filtering conditions that can be designated on the user terminal 160. For example, the display control unit 234 may acquire, from the target table 310, the located zones and position coordinates of the targets of management estimated to be located in the designated zone now.

Next, in S42, the display control unit 234 acquires map image data of the designated zone from the zone table 320. Next, in S43, the display control unit 234 sets a plurality of coordinate areas in the designated zone.

Next, in S44, based on the located zones of the one or more targets of management acquired in S41, the display control unit 234 generates a list of the targets of management on a categorized-by-located-zone basis as located zone information. In addition, in S45, based on the position coordinates of the one or more targets of management acquired in S41, the display control unit 234 generates statistical information of the targets of management on a categorized-by-coordinate-area basis as coordinate area information.

Next, in S46, the display control unit 234 transmits the generated located zone information to the user terminal 160 via the communication unit 210. The control unit 161 of the user terminal 160 controls the display unit 171 to display the located-zone-by-located-zone list of the targets of management in the list display area 720 of the information browsing screen 700. In addition, in S47, the display control unit 234 transmits the generated coordinate area information together with the map image data to the user terminal 160 via the communication unit 210. The control unit 161 of the user terminal 160 controls the display unit 171 to perform superimposed display of the categorized-by-coordinate-area statistical information on the map image in the map display area 710 of the same screen, namely, the information browsing screen 700.

When the conditions for filtering the targets of management to be displayed are changed, the display control processing in S41 and the subsequent steps may be executed again to update the screen display. The display control unit 234 may monitor the location information stored in the target table 310, and, when there is a change in the location information, may execute the display control processing again and cause the control unit 161 of the user terminal 160 to update the screen display.

Figure 24:
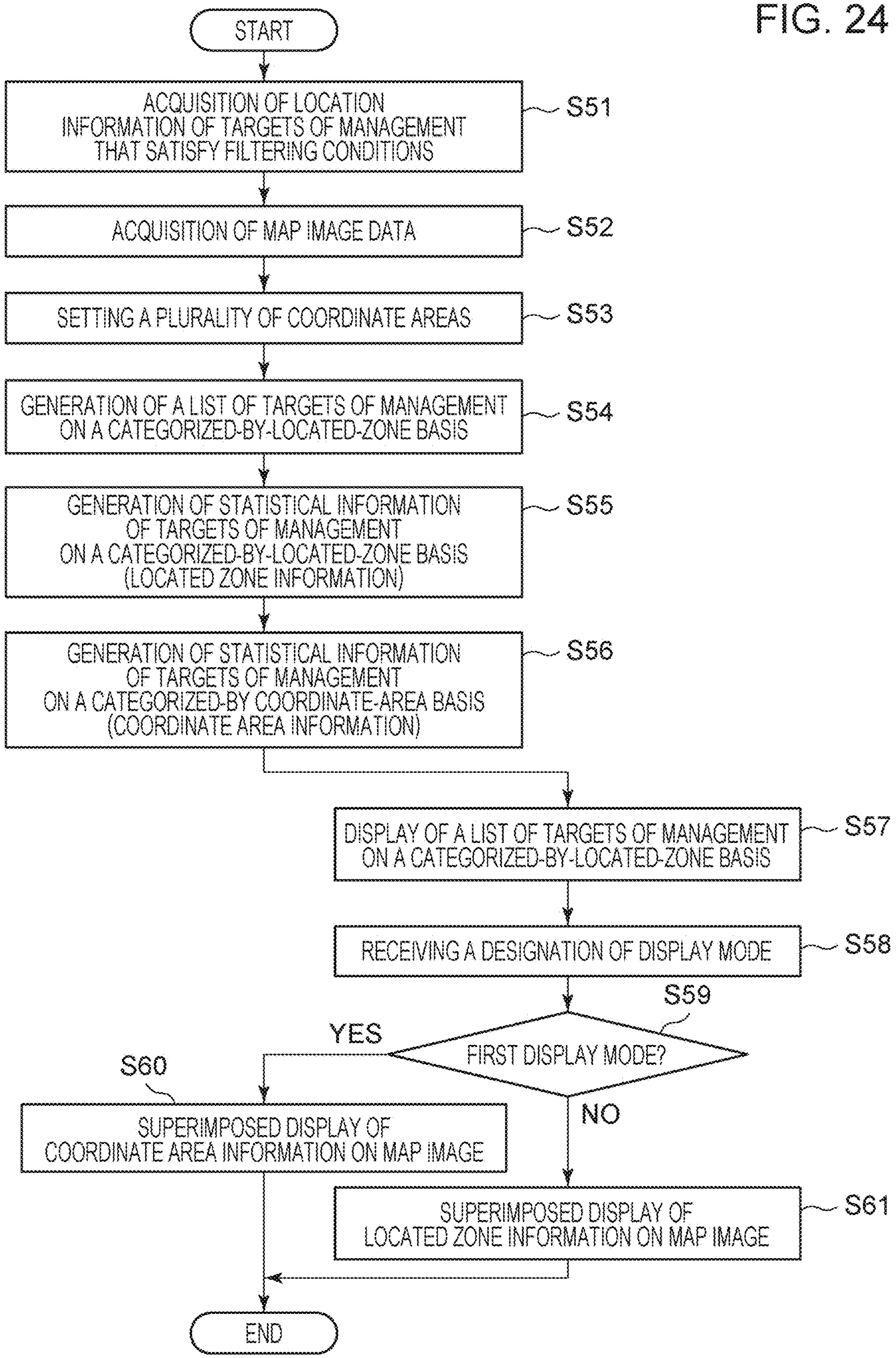
FIG. 24 is a flowchart illustrating a second example of the flow of display control processing according to an embodiment.

FIG. 24 is a flowchart that illustrates an example of the flow of display control processing performed by mutually cooperative operation of the user terminal 160 and the management server 200. It is assumed here that the information browsing screen 700 according to the example having been described with reference to FIG. 16 is called up by the user and is displayed by the display unit 171 under the control by the control unit 161 of the user terminal 160.

First, in S51, the display control unit 234 of the management server 200 acquires, from the target table 310, the location information of one or more targets of management that satisfy filtering conditions that can be designated on the user terminal 160. Next, in S52, the display control unit 234 acquires map image data of the designated zone from the zone table 320. Next, in S53, the display control unit 234 sets a plurality of coordinate areas in the designated zone.

Next, in S54, based on the located zones of the targets of management, the display control unit 234 generates a list of the targets of management on a categorized-by-located-zone basis. In addition, in S55, based on the located zones of the targets of management, the display control unit 234 generates statistical information of the targets of management on a categorized-by-located-zone basis as located zone information. Moreover, in S56, based on the position coordinates of the targets of management, the display control unit 234 generates statistical information of the targets of management on a categorized-by-coordinate-area basis as coordinate area information.

Next, in S57, the display control unit 234 transmits the generated categorized-by-located-zone list of the targets of management to the user terminal 160 via the communication unit 210. The control unit 161 of the user terminal 160 controls the display unit 171 to display the located-zone-by-located-zone list of the targets of management in the list display area 720 of the information browsing screen 700. Next, in S58, the control unit 161 receives a designation of the mode of display by the user via the operation unit 165. In a case where the first display mode of superimposing coordinate area information on a map image is designated (S59: YES), the process proceeds to S60.

In a case where the second display mode of superimposing located zone information on the map image is designated (S59: NO), the process proceeds to S61.

In S60, the display control unit 234 transmits the coordinate area information together with the map image data to the user terminal 160 via the communication unit 210. The control unit 161 of the user terminal 160 controls the display unit 171 to perform superimposed display of the categorized-by-coordinate-area statistical information on the map image in the map display area 710 of the information browsing screen 700. On the other hand, in S61, the display control unit 234 transmits the located zone information together with the map image data to the user terminal 160 via the communication unit 210. The control unit 161 of the user terminal 160 controls the display unit 171 to perform superimposed display of the categorized-by-located-zone statistical information on the map image in the map display area 710 of the information browsing screen 700.

Similarly to the above-described example, when the conditions for filtering the targets of management to be displayed are changed, the display control processing in S41 and the subsequent steps may be executed again to update the screen display. The display control unit 234 may monitor the location information stored in the target table 310, and, when there is a change in the location information, may execute the display control processing again and cause the control unit 161 of the user terminal 160 to update the screen display.

The information browsing screen 700 according to the examples having been described with reference to FIGS. 18 and 19 can also be displayed by performing similar display control processing.

5. Concluding Remarks

With reference to FIGS. 1 to 24, various embodiments, examples, and variation examples of techniques according to the present disclosure have been described in detail so far. In the embodiments having been described above, a plurality of first wireless devices in each of which first identification information for identifying the corresponding target of management is stored is attached respectively to a plurality of targets of management movable in a real space. In the real space, a plurality of second wireless devices in each of which second identification information unique thereto is stored is installed. Based on a result of reading the first identification information from the first wireless device by a first reading device and a result of reading the second identification information from the second wireless device by the first reading device, position coordinates where each target of management is located are estimated. The real space is regularly segmented into a plurality of coordinate areas. A display control unit causes a display device to display coordinate area information regarding a coordinate area to which position coordinates estimated for each of the plurality of targets of management belong. With the above configuration, rough information in units of coordinate areas, rather than the specific location of each target of management, is displayed; therefore, in a situation where many targets of management are dealt with, it is possible to avoid congestion of pieces of information on the screen and thus to avoid resultant poor visibility. For example, as the coordinate area information, a mark that indicates the coordinate area where the designated target of management is estimated to be located or statistical information on a categorized-by-coordinate-area basis or may be presented. This enables the user to easily and quickly know the distribution of located places of a plurality of targets of management and a rough located place of the target of management of particular interest.

In location estimation using a self-location estimation method, as a result of cumulative errors in movement amount measurement, location information with high accuracy cannot always be obtained. In view of this, by displaying coordinate-area-based information instead of displaying an estimated location specifically, it is possible to present stable information while suppressing sensitivity in display information to the cumulative errors. Also, by making it possible to not only display coordinate area information but also display, in parallel or selectively, information regarding the located zone of the target of management that can be estimated without relying on a self-location estimation method, it is possible to more effectively assist the user in grasping the located place of the target of management.

In the embodiments having been described above, based on the results of reading identification information from a first wireless device and a second wireless device by a first reading device, estimation is performed as to which zone each target of management is located in and as to which spot each target of management is located at. Such reading of identification information from a wireless device does not require communication with an external apparatus such as a GPS satellite or a wireless base station. Therefore, it is possible to gather records to be used for location information estimation in a stable manner also in an environment in which it is difficult to perform external communication, for example, indoors, under the ground, inside a tunnel, or the like.

In the embodiments having been described above, a plurality of zones is set in a real space with a plurality of different spatial granularities, and the located zone of each target of management is any of the plurality of zones. Based on granularity that differs depending on type information associated with each target of management, the located place of this target of management is checked against the planned place in process management, and the status of the work process is updated. Therefore, the scheme according to the embodiments having been described above is especially useful for grasping the located place of the target of management in process management of a work that involves movement of the target of management. However, the uses of the techniques according to the present disclosure are not limited thereto.

6. Other Embodiments

The embodiments having been described above may be implemented by supplying, to a system or an apparatus via a network or in the form of a storage medium, a program that realizes one or more functions, and by causing one or more processors in the computer of the system or the apparatus to read out and run the program. The present disclosure may be embodied by means of circuitry (for example, ASIC) that realizes the one or more functions.

The present disclosure is not limited to the embodiments having been described above, and various alterations and modifications can be made without departing from the spirit and scope of the present disclosure. Claims are appended hereto so as to make the claimed scope of the present disclosure public.

According to the present disclosure, an improved scheme for displaying information regarding the located place of the target of management is provided.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-171097, which was filed on Oct. 2, 2023 and which is hereby incorporated by reference herein in its entirety.

What is claimed is:

1. A display control system, comprising:

a plurality of first wireless devices attached respectively to a plurality of targets of management movable in a real space, first identification information for identifying a corresponding target of management being stored in each of the plurality of first wireless devices;

at least one reading device that is capable of reading, from a wireless device, identification information stored in the wireless device;

one or more processors; and one or more memories storing instructions that, when executed by the one or more processors, cause the display control system to:

estimate, based on a result of reading the first identification information from one of the plurality of first wireless devices by the reading device, position coordinates where each of the plurality of targets of management is located, cause a display device to display information regarding the plurality of targets of management, segment the real space into a plurality of coordinate areas regularly and set a block area by grouping two or more coordinate areas among the plurality of coordinate areas, generate block area information that represents the block area and includes information indicating a total number of targets of management estimated to be located in the block area, generate a plurality of pieces of coordinate area information respectively corresponding to the two or more coordinate areas included in the block area, each of the plurality of pieces of coordinate area information indicating information regarding one or more targets of management whose estimated position coordinates belong to a corresponding coordinate area, and display, on the display device, the block area information and the plurality of pieces of coordinate area information in association with the block area.

2. The display control system according to claim 1, further comprising:

a plurality of second wireless devices each installed in the real space and each storing second identification information unique thereto, wherein the instructions, when executed by the one or more processors, further cause the display control system to, based on a result of reading the first identification information from one of the plurality of first wireless devices by the reading device and a result of reading the second identification information from one of the plurality of second wireless devices by the reading device, estimate the position coordinates where each of the plurality of targets of management is located.

3. The display control system according to claim 2, wherein the plurality of coordinate areas is set correspondingly for the plurality of second wireless devices each installed in the real space.

4. The display control system according to claim 3, wherein the instructions, when executed by the one or more processors, further cause the display control system to display the plurality of pieces of coordinate area information within the block area information.

5. The display control system according to claim 4, wherein each of the plurality of pieces of coordinate area information includes name information regarding a corresponding target of management, of the plurality of targets of management, estimated to be located in a corresponding one of the plurality of coordinate areas.

6. The display control system according to claim 2, wherein the instructions, when executed by the one or more processors, further cause the display control system to:

based on a movement amount of the reading device between a point in time of reading the first identification information from one of the plurality of first wireless devices by the reading device and a point in time of reading the second identification information from one of the plurality of second wireless devices by the reading device, estimate the position coordinates where each of the plurality of targets of management is located.

7. The display control system according to claim 1, wherein the instructions, when executed by the one or more processors, further cause the display control system to set sizes of the plurality of coordinate areas variably in accordance with user settings.

8. The display control system according to claim 1, wherein the instructions, when executed by the one or more processors, further cause the display control system to cause the display device to perform superimposed display of the block area information and the plurality of pieces of coordinate area information on a map image regarding the real space.

9. A method for causing a display device to display information regarding a plurality of targets of management movable in a real space, a plurality of first wireless devices being attached respectively to the plurality of targets of management, first identification information for identifying a corresponding target of management being stored in each of the plurality of first wireless devices, and the real space being segmented into a plurality of coordinate areas regularly, the method comprising:

estimating, based on the first identification information, position coordinates where each of the plurality of targets of management is located;

setting a block area by grouping two or more coordinate areas among the plurality of coordinate areas;

generating block area information that represents the block area and includes information indicating a total number of targets of management estimated to be located in the block area;

generating a plurality of pieces of coordinate area information respectively corresponding to the two or more coordinate areas included in the block area, each of the plurality of pieces of coordinate area information indicating information regarding one or more targets of management whose estimated position coordinates belong to a corresponding coordinate area; and displaying, on the display device, the block area information and the plurality of pieces of coordinate area information in association with the block area.

10. An information processing apparatus configured to cause a display device to display information regarding a plurality of targets of management movable in a real space, a plurality of first wireless devices being attached respectively to the plurality of targets of management, first identification information for identifying a corresponding target of management being stored in each of the plurality of first wireless devices, a plurality of second wireless devices being installed in the real space, second identification information unique thereto being stored in each of the plurality of second wireless devices, and the real space being segmented into a plurality of coordinate areas regularly, the information processing apparatus comprising:

one or more processors; and one or more memories storing instructions that, when executed by the one or more processors, cause the information processing apparatus to:

estimate, based on a result of reading the first identification information from one of the plurality of first wireless devices by a reading device and a result of reading the second identification information from one of the plurality of second wireless devices by the reading device, position coordinates where each of the plurality of targets of management is located;

set a block area by grouping two or more coordinate areas among the plurality of coordinate areas;

generate block area information that represents the block area and includes information indicating a total number of targets of management estimated to be located in the block area;

generate a plurality of pieces of coordinate area information respectively corresponding to the two or more coordinate areas included in the block area, each of the plurality of pieces of coordinate area information indicating information regarding one or more targets of management whose estimated position coordinates belong to a corresponding coordinate area; and control the display device to display the block area information and the plurality of pieces of coordinate area information in association with the block area.

* * * * *